US006760918B2

(12) United States Patent
Rodriguez et al.

(10) Patent No.: US 6,760,918 B2
(45) Date of Patent: Jul. 6, 2004

(54) METHOD AND APPARATUS FOR RECORDABLE MEDIA CONTENT DISTRIBUTION

(75) Inventors: Arturo A. Rodriguez, Norcross, GA (US); Randolph R. Beebe, Duluth, GA (US); Geoffrey G. Hammett, Norcross, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 332 days.

(21) Appl. No.: 09/896,331

(22) Filed: Jun. 29, 2001

(65) Prior Publication Data

US 2003/0005453 A1 Jan. 2, 2003

(51) Int. Cl.[7] .............................................. H04N 7/173
(52) U.S. Cl. ........................ 725/134; 725/142; 725/133; 725/141; 725/153; 386/125
(58) Field of Search ............................. 725/86, 89, 100, 725/151, 131, 134, 142, 139; 386/1, 45, 83, 125–126

(56) References Cited

U.S. PATENT DOCUMENTS

| | | | |
|---|---|---|---|
| 4,528,643 A | 7/1985 | Freeny | 364/900 |
| 4,706,121 A | 11/1987 | Young | 358/142 |
| 4,908,713 A | 3/1990 | Levine | 358/335 |
| 4,949,187 A | 8/1990 | Cohen | 358/335 |
| 4,963,994 A | 10/1990 | Levine | 358/335 |
| 5,253,066 A | 10/1993 | Vogel | 358/188 |
| 5,293,357 A | 3/1994 | Hallenbeck | 348/734 |
| 5,477,262 A | 12/1995 | Banker et al. | 348/7 |
| 5,479,268 A | 12/1995 | Young et al. | 358/335 |
| 5,508,815 A | 4/1996 | Levine | 358/335 |
| 5,568,272 A | 10/1996 | Levine | 386/48 |
| 5,619,247 A | 4/1997 | Russo | 348/3 |
| 5,654,747 A * | 8/1997 | Ottesen et al. | 725/1 |
| 5,790,935 A | 8/1998 | Payton | 455/5.1 |
| 5,809,204 A | 9/1998 | Young et al. | 386/83 |
| 5,856,975 A | 1/1999 | Rostoker et al. | 370/395 |
| 5,915,068 A | 6/1999 | Levine | 386/83 |
| 5,990,881 A | 11/1999 | Inoue et al. | 345/327 |
| 6,088,455 A * | 7/2000 | Logan et al. | 380/200 |
| 6,532,593 B1 * | 3/2003 | Moroney | 725/142 |

OTHER PUBLICATIONS

Scientific–Atlanta, Inc. Pending Application Ser. #09/590, 521, Filing Date: Jun. 9, 2000, Title: "Systems and Methods for Adaptive Scheduling and Dynamic Bandwidth Resource Allocation Management in a Digital Broadband Delivery System," Inventors: Arturo A. Rodriguez and Dean F. Jerding.

* cited by examiner

Primary Examiner—Vivek Srivastava
Assistant Examiner—Ngoc Vu

(57) ABSTRACT

A media system which includes logic configured to provide a user interface that provides a user with a plurality of media content selections available at various times, and a portable client media drive configured to receive over a secured transmission medium the media content selected by the user.

27 Claims, 31 Drawing Sheets

IPG abc
2

ABC News
7:00 PM - 7:30 PM
Get The Latest News On
Campaign 2000

| channel | 7:00 PM | 7:30 PM | 8:00 PM | 8:3 |
|---|---|---|---|---|
| etw  301 | Extra | Entertainment News | Beach |
| ppv  400 | Saving Private Ryan *CD/DVD* | | American History *CD/DVD* | |
| ABC  2 | ABC News | Entertainment Tonight | Who wants to be a Mil... | |
| FOX  3 | The Drew Carey Show | Home Improvement | Family Guy | |
| WB  4 | The Simpsons | Friends | Buffy The Vampire .... | | tue 7/1    ⓐ browse by   ⓑ Date   ⓒ ↩

INTERACTIVE PROGRAM GUIDE ACCESS TO SERVICE GUIDE

SG
01

SERVICE GUIDE

CURRENT

TV

PROGRAM

| CHANNEL | 2:00 PM | 2:30 PM | TUE 9/1 12:01 PM 3:00 PM | 3:30 |
|---|---|---|---|---|
| ETW 301 | EXTRA | ENTERTAINMENT NEWS | | |
| PPV 400 | SAVING PRIVATE RYAN | | AMERICAN HISTORY X | |
| SG 1 | SERVICE GUIDE | SERVICE GUIDE | SERVICE GUIDE | SERVIC |
| ETV 2 | TALK SOUP | | E! BEHIND THE SCENES | |
| TVLD 3 | ONE LIFE TO LIVE | | GENERAL HOSPITAL | |

TUE 9/1  ▲ BROWSE BY  🅱 DATE

METHOD AND APPARATUS FOR RECORDABLE MEDIA CONTENT DISTRIBUTION

FIELD OF THE INVENTION

This invention relates in general to the field of television systems, and more particularly, to the field of interactive television.

BACKGROUND OF THE INVENTION

With the recent advent of digital transmission technology, subscriber network television systems are now capable of providing many other services in addition to traditional analog broadcast video. For example, two-way and advanced one-way communications between a subscriber and a subscriber network system headend are now possible. The home communication terminal ("HCT"), also known as the set-top box, has become an important computing device for accessing video services and navigating a subscriber through a maze of services available. In addition to supporting traditional analog broadcast video and functionality, digital HCTs (or "DHCTs") now also support an increasing number of enhanced video services that are made available through digital transmission technology.

Interactive television is an enhanced video technology enabled by two-way communication between a subscriber and a subscriber network system headend that is made possible by digital transmission technology and consists of such enhanced services as video-on-demand ("VOD"). In the digital transmission infrastructure that is utilized for interactive television, VOD service requires the exclusive or substantially exclusive use of bandwidth capacity, and thus, a portion of the infrastructure serves as the VOD infrastructure. Multiple System Operators ("MSOs") invests millions of dollars in the construction and maintenance of VOD infrastructures to insure that there is sufficient bandwidth capacity available for VOD service. Thus, there is a need to efficiently utilize the VOD infrastructure to generate revenue.

There are other electronic communications systems that have been used for the sale and delivery of audio, video, and other products that can be transmitted electronically. For example, one may be able to purchase an audio product on the Internet and then download it to a personal computer for future use. The application of electronic communications systems for the sale and delivery of applicable products can offer advantages over more conventional product sales and delivery systems such as phone ordering with parcel delivery. For example, advantages may be offered such as the lower cost of product delivery or the savings of not requiring inventory, floor space, and retail employees. But, the present electronic communications sales and delivery systems are subject to problems with piracy of source content resulting in lost sales and revenues, and are generally incapable of consistent fast delivery. Furthermore, these systems are designed with provisions for delivering media products at master quality. Thus, there is a need for secure and fast sale and delivery of master quality audio, video, software, and other products by way of an electronic communications system.

SUMMARY OF THE INVENTION

The preferred embodiment of the present invention can be viewed, among other things, as a media system which includes logic configured to provide a user interface that provides a user with a plurality of media content selections available at various times, and a portable client media drive configured to receive over a secured transmission medium the media content selected by the user.

The preferred embodiment of the present invention also provides a method for recording media content. This method can be broadly summarized as follows: providing a user interface to select from a plurality of media content selections available at different times; receiving from a remote device the selected media content over a secured transmission medium; and recording the selected media content onto at least one portable medium.

Other systems, methods, features, and advantages of the preferred embodiments of the invention will be or become apparent to one with ordinary skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The preferred embodiments of the invention can be better understood with reference to the following drawings. The components in the drawings are not necessarily to scale, and emphasis is instead being placed upon clearly illustrating the principles of the preferred embodiments of the invention. Moreover, in the drawings, like reference numerals designate corresponding parts throughout the several views.

FIG. 17 is a screen diagram of an example IPG screen for accessing purchasable recordable media content, in accordance with one embodiment of the invention.

FIG. 18 is a screen diagram of an example IPG screen for accessing a service guide.

DETAILED DESCRIPTION OF THE PREFERRED EMBODIMENTS

The preferred embodiments of the invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" given herein are intended to be non-limiting.

Figure 1:
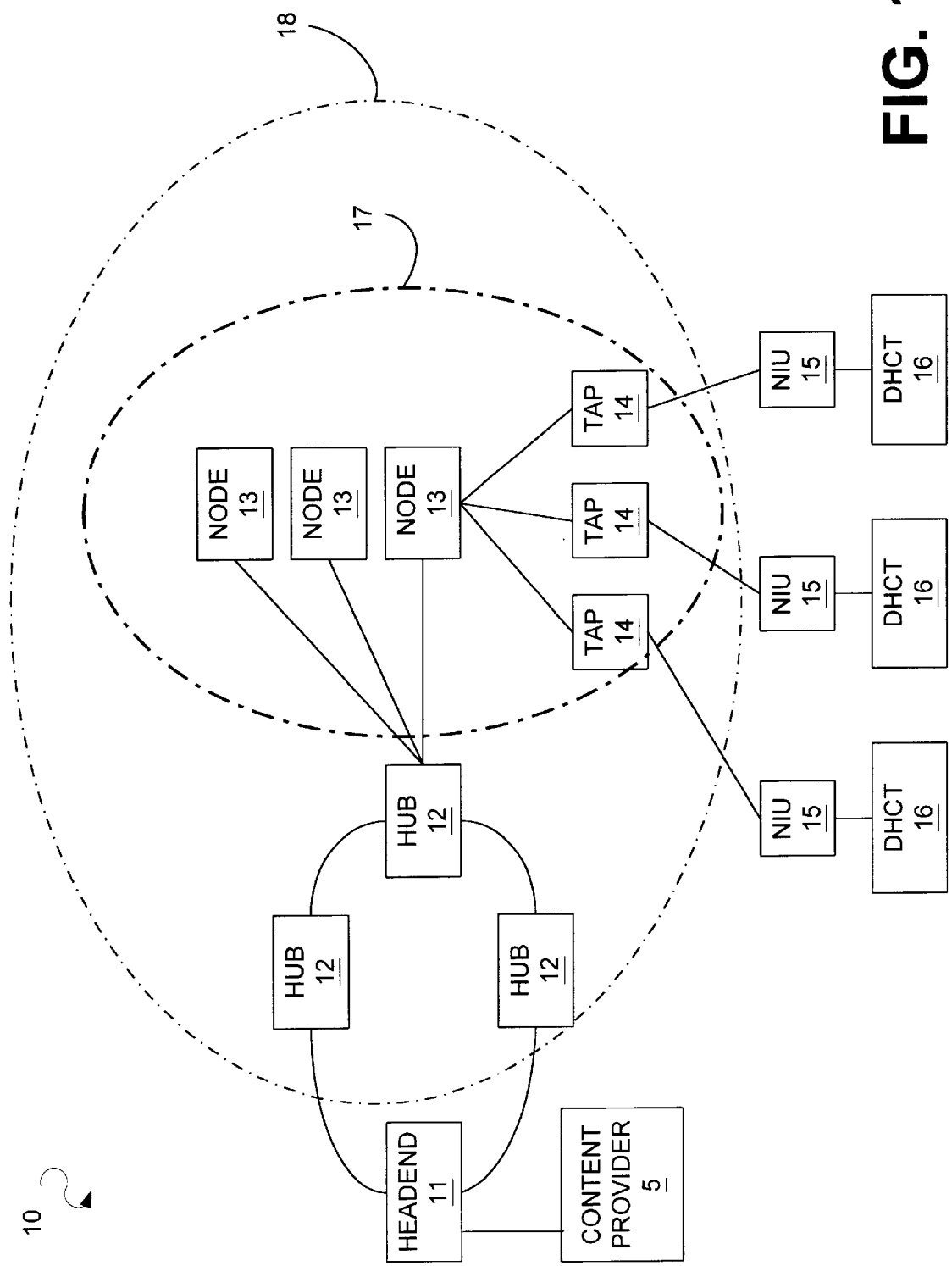
FIG. 1 is a block diagram of an example Digital Broadband Delivery System (DBDS), in accordance with one embodiment of the invention.

One preferred embodiment of the present invention is generally implemented as part of a subscriber network television system, such as for a non-limiting example, a digital broadband delivery system (DBDS) or a cable television system (CTS). Hence, an illustrative DBDS and its operation will be described initially. Other conventional data delivery systems are also included within the scope of the present invention. FIG. 1 shows a block diagram view of a DBDS 10, which is generally a high quality, reliable and integrated network system that is preferably capable of delivering video, audio, voice and data services to client devices, such as a digital home communication terminal devices (DHCTs) 16. Although FIG. 1 depicts a high level view of a DBDS 10, it should be appreciated that a plurality of DBDS systems can tie together a plurality of regional networks into an integrated global network so that DHCT users can receive media content provided from anywhere in the world.

The DBDS 10 preferably delivers broadcast video signals as digitally formatted signals in addition to delivering traditional broadcast analog video signals. Furthermore, the system can preferably support one way broadcast services as well as both one-way data services and two-way media and data services. The two-way operation of the network preferably allows for user interactivity with services, such as Pay-Per-View programming, Near Video-On-Demand (NVOD) programming according to any of several known NVOD implementation methods, View-on-Demand (VOD) programming (according to any of several VOD implementation methods), and interactive applications, such as Internet connections.

The DBDS 10 also provides the interfaces, network control, transport control, session control, and servers to access media content from media services, and distributes media content to DHCT users. Note that the term media content will be understood to mean the content stored and delivered throughout the DBDS 10, such as movies, software, music, etc. When it is helpful to discuss each individual movie or program, etc. (i.e. media content in the singular), the term media content instance or the like will be used. The title of that media content instance will be referred to as a media content title. As shown in FIG. 1, a typical DBDS 10 comprises a head end 11, hubs 12, an HFC access network 17, and DHCTs 16. It should be appreciated that although a single component (e.g. a head end) is illustrated in FIG. 1, a DBDS 10 can feature a plurality of any one of the illustrated components or may be configured with alternative embodiments for any one of the individual components or with yet other additional components not enumerated above. Media content provided by one or more content providers, such as content provider 5, is communicated by the content providers to one or more head ends 11. From those head ends 11 the content is then communicated over a communications network 18 that includes a plurality of HFC access networks 17 (only one HFC access network 17 is illustrated). The HFC access network 17 preferably comprises a plurality of HFC nodes 13, each of which may serve a local geographical area. The hub 12 connects to the HFC node 13 through a fiber portion of the HFC access network 17. The HFC node 13 is connected to a tap 14 which, in one implementation, is connected to a digital home communication terminal (DHCT) 16. In other implementations, the tap 14 is connected to a network interface unit (NIU) 15 which is connected to a digital home communication terminal (DHCT) 16. The NIU 15 is normally located at the property of a user and provides a transparent interface between the HFC node 13 and the users' internal wiring. Coaxial cables are typically used to couple nodes 13, taps 14 and NIUs 15 because the electrical signals can be easily repeated with radio frequency (RF) amplifiers. As the high-level operations of many of the functions of a DBDS 10 are well known to those of skill in the art, further high level description of the overall DBDS 10 of FIG. 1 will not be contained herein. It will be appreciated, however, that the DBDS 10 shown in FIG. 1 is merely illustrative and should not be construed as implying any limitations upon the scope of the embodiments of the invention. For instance, subscriber network television systems also included within the scope of the embodiments of the invention include systems not utilizing physical structured cabling for transmission, such as, but not limited to, satellite systems. Further, transmission media included within the scope of the embodiments of the invention include, but are not limited to, HFC, optical, satellite, RF, FM, and microwave. Further, data provided from the head end 11 to the DHCTs 16 and programming necessary to perform the functions discussed below will be understood to be present in the DBDS 10, in accordance with the description below.

Figure 2:
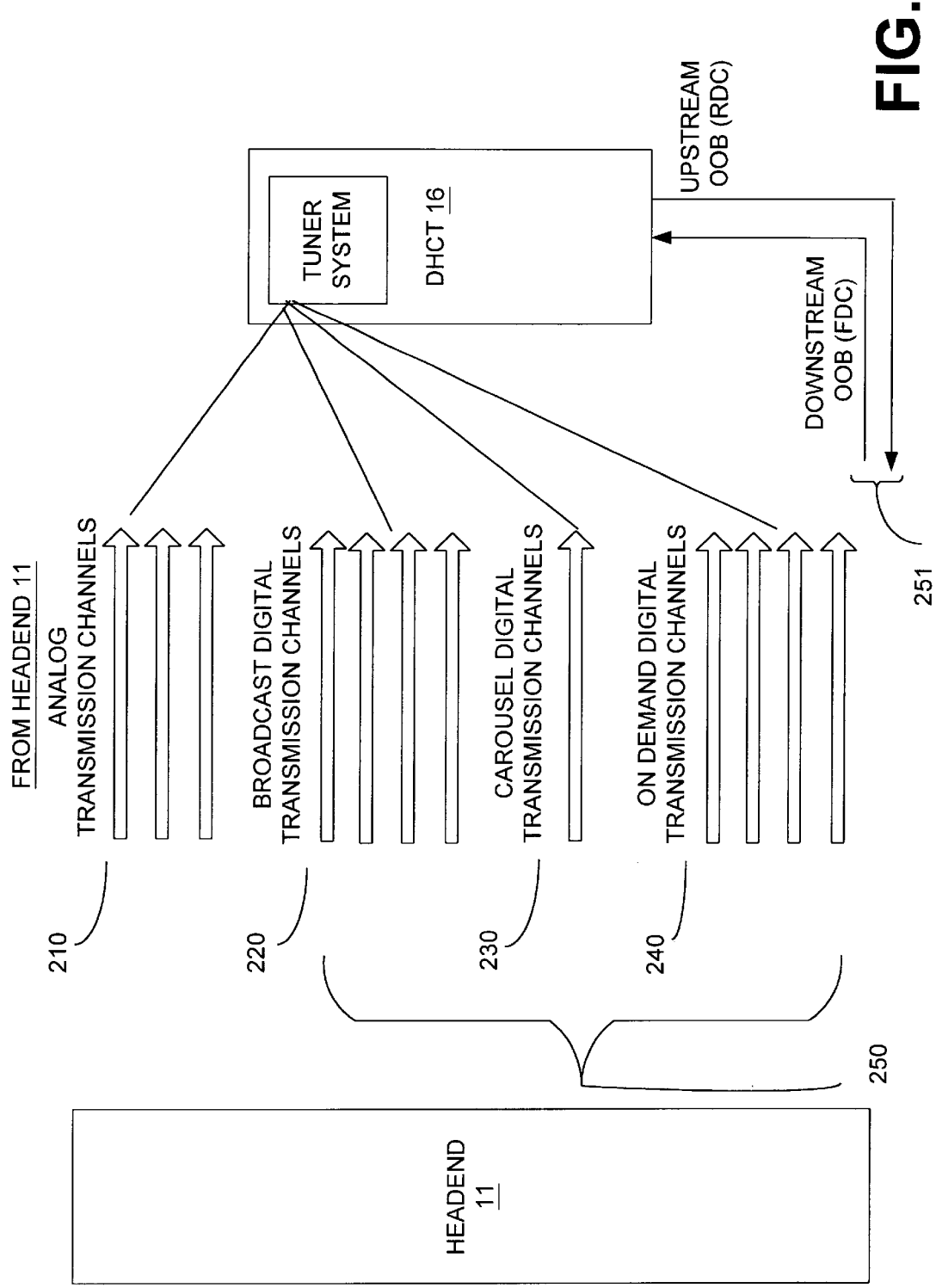
FIG. 2 illustrates a block diagram of types of input and output channels to a DHCT supported by the example DBDS of FIG. 1, in accordance with one embodiment of the invention.

FIG. 2 shows one implementation of transmission channels supported by the DBDS 10 illustrated in FIG. 1, as delivered by the head end 11 and received as input channels by the DHCT 16. Although one DHCT 16 and one head end 11 are illustrated, it is understood by those having ordinary skill in the art that more than one of each may be included in a subscriber network television system. As indicated in FIG. 2, the subscriber network television system can simultaneously support a number of transport channel types and modulation formats. The ability to carry analog and digital signals over a large bandwidth are characteristics of a hybrid fiber/coax (HFC) network typically employed in a subscriber network television system. As will be appreciated by those of ordinary skill in the art, analog and digital signals in HFC networks can be multiplexed using, in one implementation, frequency division multiplexing (FDM), which enables many different types of signals to be transmitted over the subscriber network television system to the DHCT 16. In one typical implementation, a subscriber network television system using HFC supports downstream (i.e. in the direction from the head end 11 to the DHCT 16) frequencies from 50 MHz to 870 MHz, whereas upstream frequencies (i.e. in the direction from the DHCT to higher levels of the system) are in the 5 MHz to 42 MHz band. Generally, the RF channel bandwidth spacing for analog and digital services is 6 MHz. Furthermore, for a typical 870 MHz system in the U.S., a possible downstream RF spectrum subdivision plan uses 6 MHz spaced RF channels within the 50 MHz to 550 MHz band for analog video carriers and within the 550 MHz to 870 MHz range for digital carriers.

Referring again to FIG. 2, the downstream direction channels, having been multiplexed preferably using frequency division multiplexing (FDM), and often referred to as in band channels, include Analog Transmission Channels (ATCs) 210 and Digital Transmission Channels (DTCs) 250. These channels carry video, audio, and data services. For example, these channels can carry television signals, Internet data, or any additional types of data, such as Electronic Program Guide (EPG) data. The signals and data carried on these channels are provided through software, collectively referred to herein as services, as further defined below. The ATCs 210 are typically broadcast in 6 MHz channels having an analog broadcast composed of analog video and analog audio, and include Broadcast TV Systems Committee (BTSC) stereo and Secondary Audio Program (SAP) audio.

Like the ATCs 210, the DTCs 250 each occupy 6 MHz of the RF spectrum. However, the DTCs 250 are preferably digital channels consisting of 64- or 256-Quadrature Amplitude Modulated (QAM) digital signals formatted as MPEG-2 transport streams, allocated in a separate frequency range. The MPEG-2 transport stream enables transmission of a plurality of DTC channel types over each 6 MHz RF channel, as compared to a 6 MHz ATC 210. Three types of digital transport channels 250 illustrated in FIG. 2 include broadcast digital transmission channels 220, carousel digital transmission channels 230, and on-demand transmission channels 240. MPEG-2 transport may be used to multiplex video, audio, and data in each of these digital transmission channels (DTCs) 220. However, because MPEG-2 transport streams multiplex video, audio, and data to be placed in the same stream, the DTCs 250 do not necessarily have to be allocated in separate 6 MHz RF frequencies, unlike the ATCs 210.

Continuing with FIG. 2, the broadcast DTCs 220 and carousel DTCs 230 preferably function as continuous feeds for indefinite time, whereas the on demand DTCs 240 are continuous feed sessions for a limited time. Preferably, all DTCs 250 are capable of being transmitted at high data rates. The broadcast DTCs 220 preferably carry data comprising multiple digitally compressed and formatted as MPEG-2, TV channels and other continuously fed data information. The carousel DTCs 230 carry broadcast data, such as EPG data and data for a catalog of recordable media content, that is systematically broadcast in a cycling fashion but updated and revised as need be. Thus, the carousel DTCs 230 can serve to carry high volume data, such as EPG data and purchasable recordable media (PRM) catalog data, as well as other data at high data rates. The carousel DTCs 230 preferably carry data formatted in directories and files by a Broadcast File System (BFS), which is used for producing and transmitting data streams throughout the subscriber network television system, and which provides an efficient method for delivery of application executables and application data to the DHCT 16. The on demand DTCs 240 can carry particular information, such as compressed video and audio pertaining to subscriber requested video services or recordable media content, as well as other specialized data information. Each carousel DTC 230 and on demand DTC 240 is defined by a session managed by a session manager 334 in FIG. 3, via an MPEG-2 Digital Storage Media—Command and Control (DSM-CC) protocol.

Also shown in FIG. 2 is an Out-Of-Band (OOB) channel 251 that provides a continuously available two-way signaling path to the DHCT 16 regardless of which in-band channels are tuned to by an individual DHCT 16 in-band tuner. The DHCT 16 may also comprise multiple in-band tuners in which case the OOB channel 251 complements the service of the set of in-band tuners. The OOB channel 251 consists of a forward data channel (FDC) and a reverse data channel (RDC). The OOB channel 251 can comply to any one of a number of well known transport protocols but preferably complies to either a DAVIC 1.1 Transport Protocol with FDC of 1.544 MBps or more using Quadrature Phase-Shift Keying (QPSK) modulation and an RDC of 1.544 Mbps or more using QPSK modulation, or to a DOCSIS Transport Protocol with FDC of 27 Mbps using 64-QAM modulation and a RDC of 1.544 Mbps or more using QPSK modulation or 16-QAM modulation. The OOB channel 251 provides the two-way operation of the network, which allows a subscriber interactivity with the services provided by the network. Therefore, the DHCT 16 preferably contains functionality similar to a networked computer (i.e., a computer without a persistent storage device) in addition to traditional set top box functionality, as is well known in the art. Furthermore, the OOB channel 251 is not limited to a 6 MHz spectrum, but generally to a smaller spectrum, such as 1.5 or 3 MHz, in one embodiment.

Figure 3:
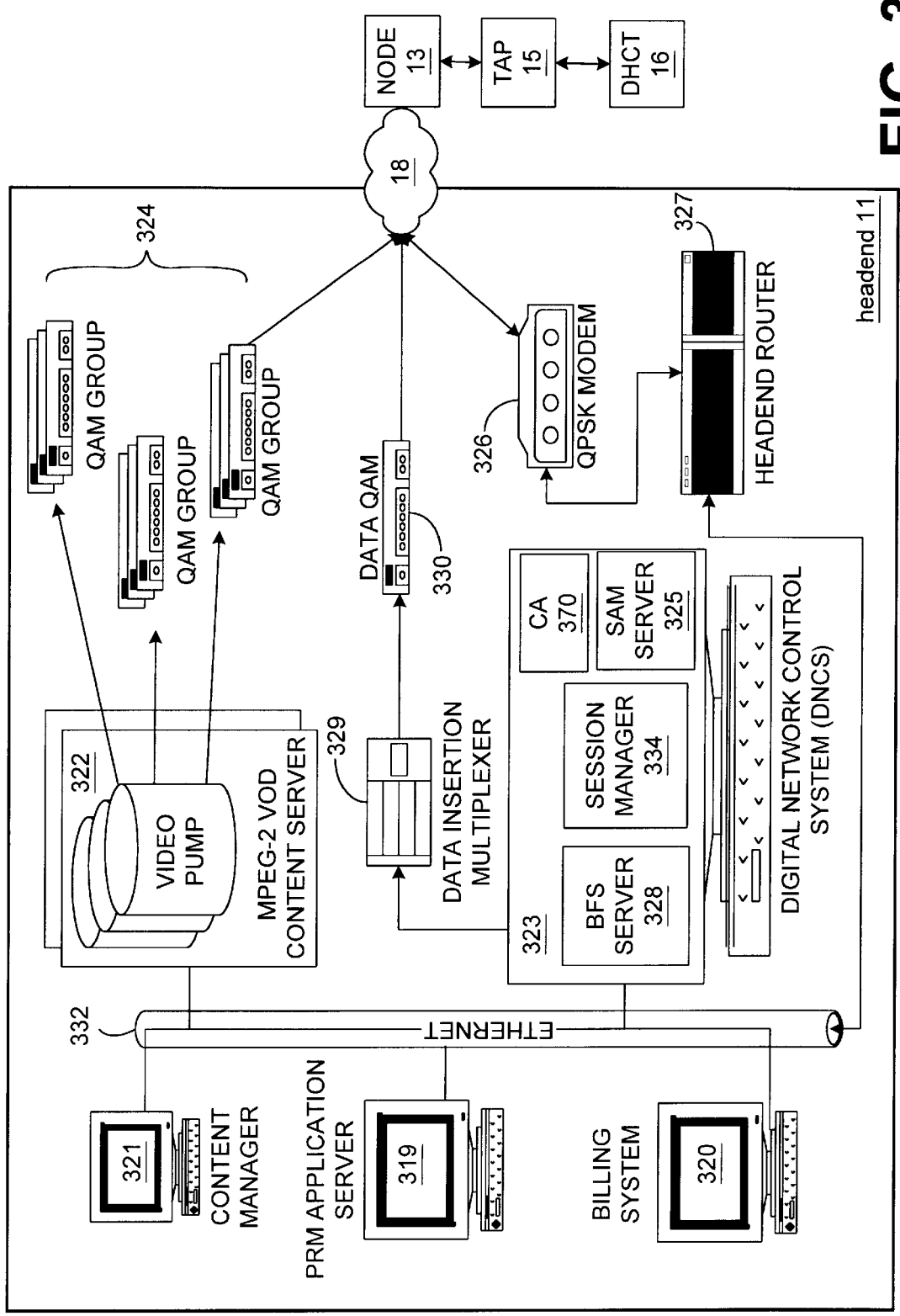
FIG. 3 is a block diagram of the example headend depicted in FIG. 1, in accordance with one embodiment of the invention.

FIG. 3 is a block diagram of the example headend 11 depicted in FIG. 1, as configured in a subscriber network television system, to provide purchasable and recordable media (PRM) content services, either as an on-demand or scheduled service with a plurality of possible delivery durations. It will be understood that the headend 11 shown in FIG. 2 is merely illustrative and should not be construed as implying any limitations upon the scope of the preferred embodiments of the invention. In the system headend 11, a PRM application server 319 and a plurality of other application servers (not shown) are connected to a digital network control system (DNCS) 323 via an Ethernet connection 332. The PRM application server 319 preferably is responsible for the following: reserving and configuring system resources needed to provide PRM services, for packaging, configuring and making available the executable software program comprising a PRM application client 477 (FIG. 4), for providing configuration and service data (such as a catalog of recordable media content categorized and displayed by titles available for rent and/or purchase) to PRM application clients 477 (FIG. 4), and for storing data at the request of a PRM application client 477. A PRM application client 477 executing on processor 444 (FIG. 4) in DHCT 16 generates a user interface that is displayed on television 441 (FIG. 4) for the subscriber to browse, purchase, and access media content such as movies, CDs, video clips, etc. This may require, among other things, engaging, preferably, in a direct two-way IP (Internet Protocol) connection with VOD content servers 322.

The DNCS 323 provides management, monitoring, and control of the DBDS 10 (FIG. 1) network elements and broadcast services provided to users. The DNCS 323 provides control and communication functionality by monitoring the DHCTs 16 and facilitating messaging between the DHCTs 16 and components within the headend 11. When any of the communication functionality is provided by headend 11 components other than the DNCS 323, the DNCS 323 indirectly provides similar functionality by providing the control and coordination to those other devices that provide the required communication functionality to enact a particular media service.

Figure 4:
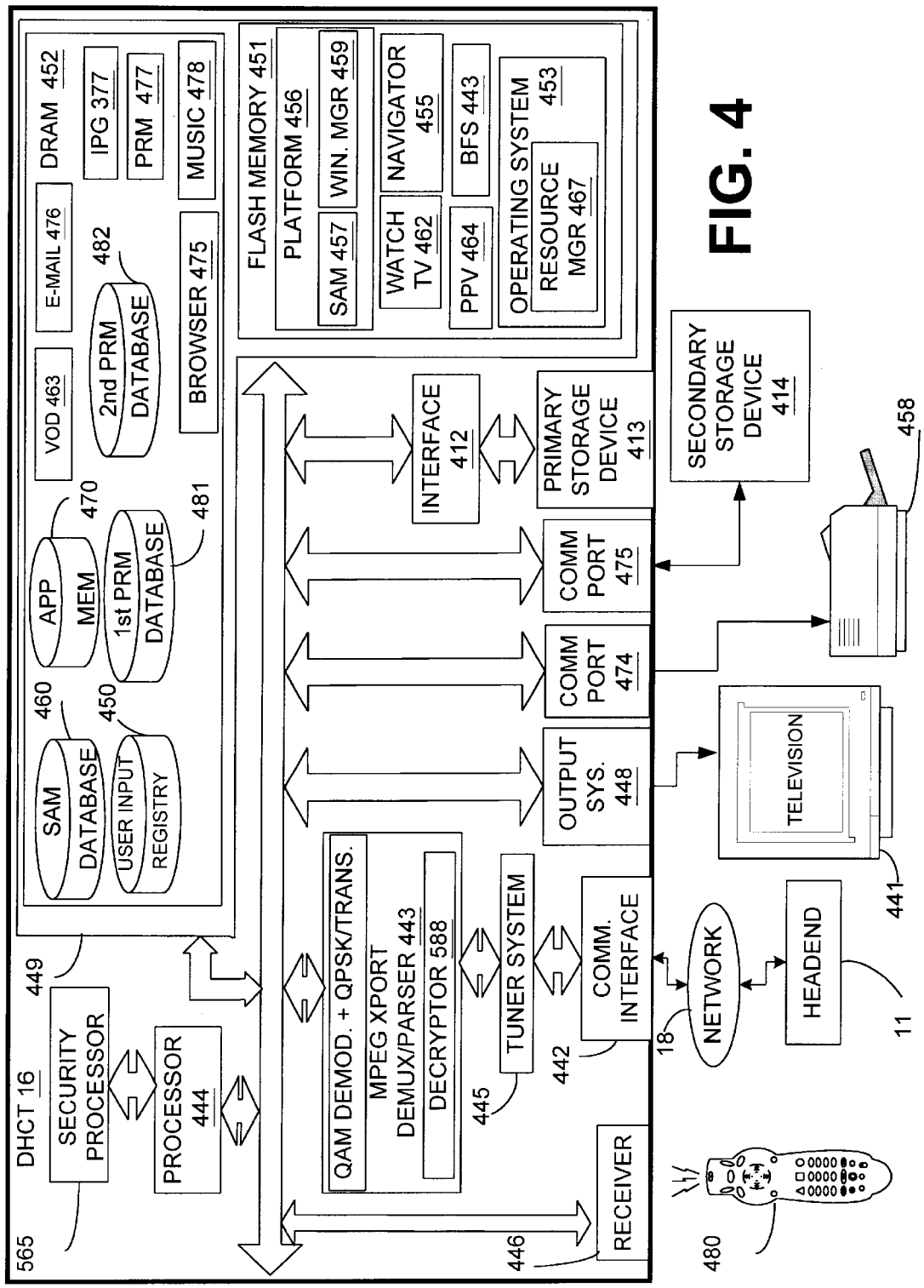
FIG. 4 is a block diagram of the example DHCT depicted in FIG. 1, in accordance with one embodiment of the invention.

In one implementation, the DNCS 323 includes functional support for client-server applications and other components in the DBDS 10 (FIG. 1) with its server counterparts, including BFS Server 328 and SAM server 325, which will be described in greater detail below. Briefly, the client-server application counterparts work in coordination with DNCS 323 to effectively utilize the primary features of the interactive television system and manage the sale and delivery of audio, video, software, and other media content. Furthermore, the client-server application software in communication with DNCS 323 can effectively redirect allocation of excess VOD infrastructure capacity to facilitate maximum rate delivery of (PRM) content and also manages impulse purchase and trial purchase transactions, in cooperation with the PRM application client 477 (FIG. 4). Also, in one implementation, the DNCS 323 uses a data insertion multiplexor 329 and a data QAM 330 to insert the in-band broadcast file system (BFS) data into a compressed data stream, for example, an MPEG-2 transport stream.

The DNCS 323 includes a session manager 334 and a conditional access system 370. The session manager 334 preferably uses the MPEG-2 DSM-CC protocol to coordinate requests for media content, for example, PRM content. The session manager 334 processes user to network (U-N) session signaling messages, manages allocation of session-related network resources and supports network management operations. The session manager 334 supports exclusive services, such as the PRM service, by providing the signaling interface to establish, maintain, and release client initiated exclusive sessions. The session manager 334 acts as a point of contact to the network for the DHCT 16 in the network 18 to establish individual sessions. The session manager 334 also defines a resource descriptor structure, which is used to request the network resources within a session.

The conditional access system 370 communicates with the DHCT 16 and the billing system 320 to determine whether a particular subscriber is authorized to receive PRM content. If a DHCT 16 is not authorized for PRM service, the conditional access system 370 insures that such services are not transmitted.

The PRM application server 319 communicates via the Ethernet connection 332 to a service application manager (SAM) server 325 contained on the DNCS 323. Service application manager (SAM) server 325 is a server component of a client-server pair of components, with the client component being located at the DHCT 16. Together, the client-server SAM components provide a system in which the user can access services, which are identified by an application to run and one or more parameters, such as particular data content, specific to that service. The SAM server 325 also manages the life cycle of the applications on the system, including the definition, activation, and suspension of services they provide and the downloading of the applications into the DHCT 16 as necessary. The PRM application server 319 defines its application to the SAM server 325 and the SAM server 325 instructs the BFS server 328 to add the executable code for the PRM application client 477 (FIG. 4) to a carousel (not shown) for distribution to the various DHCTs 16 in the network 18. In other embodiments, executable code is not transferred, but instead, functionality is effected through other mechanisms.

The BFS server 328 is a part of a broadcast file system that has a BFS client 443 (FIG. 4) in each DHCT 16 in the network 18. Applications on both the headend 11 and the DHCT 16 can access the data stored in the BFS server 328 in a similar manner to a file system found on disc operating systems. The BFS server 328 loads data for applications on a carousel (not shown) that sends data in a cyclical repeated fashion, each cycle approximately the same period of time so that the DHCT 16 that communicates a request for any particular data may receive it when the user desires the data. Thus, the BFS client 443 (FIG. 4) contained in the DHCT 16 that receives the broadcast from the BFS server 328 can implement the application for the user, as will be described in greater detail below.

PRM content or data can reside in the PRM application server 319, in the VOD content server 322, or in other application servers (not shown). The content manager 321 and VOD content servers 322 deliver MPEG-2 content to a group of QAM modulators 324. PRM content can reside in VOD content servers 322 as a movie, as an audio program, or as an MPEG-2 private data program. The content manager 321 is responsible for managing the content on the VOD content servers 322 and on other servers such as PRM application server 319 or other application servers (not shown). The PRM application server 319 utilizes the content manager 321 and VOD content servers 322 to deliver the data, video and/or audio streams that make up the PRM services. The PRM application server 319 is also responsible for controlling the content manager 321 and VOD content servers 322. The QAM group 324 is actually a multiplex of QAMs that support PRM content transmission to a particular DHCT 16. The session manager 334 in DNCS 323 determines which QAM modulator has access to a particular DHCT 16. The QAM modulators 324 are also responsible for encrypting the transport stream and inserting other data and information into the stream, as will be described in more detail below. The QAM modulators 324 receive the MPEG-2 transport stream from the VOD content servers 222 and convert it to an encrypted RF signal at a specified frequency (channel).

In one embodiment of the invention, content manager 321 fulfills management of VOD content and PRM content. In an alternate embodiment, content manager 321 is comprised of two entities, a first content manager dedicated to VOD content management and a second manager dedicated to PRM content management.

A Quadrature Phase-Shift Keying (QPSK) modem 326 is responsible for transporting the out-of-band IP (Internet protocol) datagram traffic between the distribution headend 11 and a DHCT 16. Data from the QPSK modem 326 is routed by headend router 327 within the headend 11. The headend router 327 is also responsible for delivering upstream application traffic, such as a user requests for PRM content, to the various application servers, such as, for example, PRM application server 319.

FIG. 4 is a block diagram illustrating a DHCT 16 that is coupled to a headend 11 and to a television 441. It will be understood that the DHCT 16 shown in FIG. 3 is merely illustrative and should not be construed as implying any limitations upon the scope of the preferred embodiments of the invention. Some of the functionality performed by applications executed in the DHCT 16 (for example, the PRM client application 477) may instead be performed at the headend 11 and vice versa, in some embodiments. A DHCT 16 is typically situated at the residence of a user or place of business and may be a stand-alone unit or integrated into another device such as, for example, a television set or a personal computer or an audio device, such as, for example, a programmable radio. The DHCT 16 preferably includes a communications interface 442 for receiving signals (video, audio and/or other data) from the headend 11 through the network 18 and for providing any reverse information to the headend 11 through the network 18.

The DHCT 16 preferably includes at least one processor 444 for controlling operations of the DHCT 16, an output system 448 for driving the television display 441, and at least one tuner system 445 for tuning into a particular television channel to be displayed and for sending and receiving various types of data or media content to and from the headend 11. The tuner system 445 includes, in one implementation, an out-of-band tuner and upstream transmitter for bi-directional QPSK data communication and a quadrature amplitude modulation (QAM) tuner (in-band) for receiving television signals. It should be appreciated that the OOB tuner and upstream transmitter can be one component, or in other embodiments, the tuner and transmitter can be independent of each other and located separately within the DHCT 16. The OOB tuner and upstream transmitter enables the DHCT 16 to interface with a subscriber network television system so that the DHCT 16 can provide upstream data to the network, for example, via a QPSK channel that serves as an upstream OOB channel and received by a QPSK receiver in QPSK modem 326 in headend 11. In this manner, a subscriber can interact with the subscriber network television system to request services or the data of services such as, for example, PRM content. Alternatively, the upstream data transmission can be effected via a QAM channel with a QAM transmitter in DHCT 16 and a QAM receiver in headend 11. Alternatively, a telephone modem in the DHCT 16 can be utilized for upstream data transmission. Further, a headend 11 or hub 12 or other component located upstream in the subscriber network television system may receive data from a telephone network coupled to a telephone modem and can route the upstream data to a destination internal or external to the subscriber network television system.

The DHCT 16 preferably includes a demultiplexing system 443 comprising functionality for QAM demodulation, forward error correction (FEC), transport demultiplexing, decryption (via decryptor 588), and parsing, as is well known in the art, to counter the effect of signal processing of broadcast media content and data in the subscriber network television system. Transport demultiplexing preferably includes MPEG-2 transport demultiplexing. The demultiplexing system 443 in communication with communication interface 442, tuner system 445 and processor 444 effects reception of compressed video streams, compressed audio streams, and compressed data streams corresponding to a selected program to be separated from other programs and/or streams transported in the tuned transmission channel and to be eventually stored in secondary storage device 414 (FIG. 4) in accordance with one embodiment of the invention, as will be described in greater detail below.

Additionally, a receiver 446 receives externally generated information, such as user inputs or commands from other devices. The DHCT 16 may also include one or more wireless or wired interfaces, also called communication ports 474 and 475, for receiving and/or transmitting data to other devices. For example, the DHCT 16 may feature USB (Universal Serial Bus), Ethernet (for connection to a computer), IEEE-1394 (for connection to media devices in an entertainment center), serial, and/or parallel ports. The user inputs may be, for example, provided by a computer or transmitter with buttons or keys located either on the exterior of the terminal or by a hand-held remote control device or keyboard that includes user-actuated buttons, or the user inputs may be aural.

In one implementation, the DHCT 16 includes system memory 449, which includes FLASH memory 451 and dynamic random access memory (DRAM) 452, for storing various applications, modules and data for execution and use by the processor 444. Basic functionality of the DHCT 16 is provided by an operating system 453 that is primarily stored in FLASH memory 451. Among other elements, the operating system 453 includes at least one resource manager 467 that provides an interface to resources of the DHCT 16 such as, for example, computing resources. An application referred to as a navigator 455 is also resident in FLASH memory 451 for providing a navigation framework for services provided by the DHCT 16. The navigator 455 registers for and in some cases reserves certain user inputs related to navigational keys such as channel increment/decrement, last channel, favorite channel, etc. The navigator 455 also provides users with television related menu options that correspond to DHCT 16 functions such as, for example, blocking a channel or a group of channels from being displayed in a channel menu.

The FLASH memory 451 also contains a platform library 456. The platform library 456 is a collection of utilities useful to applications, such as a timer manager, a compression manager, a configuration manager, an HTML parser, a database manager, a widget toolkit, a string manager, and other utilities (not shown). These utilities are accessed by applications via application programming interfaces (APIs) as necessary so that each application does not have to contain these utilities. Two components of the platform library 456 that are shown in FIG. 4 are a window manager 459 and a service application manager client (SAM) 457.

The window manager 459 provides a mechanism for implementing the sharing of the screen regions and user input. The window manager 459 in the DHCT 16 is responsible for, as directed by one or more applications, implementing the creation, display, and de-allocation of the limited DHCT 16 screen display resources. It allows multiple applications to share the screen by assigning ownership of screen regions, or windows. The window manager 459 also maintains, among other things, a user input registry 450 in DRAM 452. When a user enters a key or a command via the remote control device 480 or another input device such as a keyboard or mouse, the user input registry 450 is accessed to determine which of various applications running on the DHCT 16 should receive data corresponding to the input key and in which order. As an application is executed, it registers a request to receive certain user input keys or commands. When the user presses a key corresponding to one of the commands on the remote control device 480, the command is received by the receiver 446 and relayed to the processor 444. The processor 444 dispatches the event to the operating system 453 where it is forwarded to the window manager 459 which ultimately accesses the user input registry 450 and routes data corresponding to the incoming command to the appropriate application.

The Client SAM 457 is a client component of a client-server pair of components, with the server component being located on the headend 11 preferably in DNCS 323. A SAM database 460 (i.e. structured data such as a database or data structure) in DRAM 452 includes a data structure of services and a data structure of channels that are created and updated by the headend 11. Herein, database will refer to a database, structured data or other data structures as is well known to those of ordinary skill in the art. Many services can be defined using the same application component, with different parameters. Examples of services include, without limitation and in accordance with one implementation, presenting television programs (available through a WatchTV application 462), pay-per-view events (available through a PPV application 464), digital music (478), video-on-demand (available through an VOD application 463), purchasable recordable media (PRM) services (via PRM application client 477), and an interactive program guide (available through IPG application 377). In general, the identification of a service includes the identification of an executable application that provides the service along with a set of application-dependent parameters that indicate to the application the service to be provided. For example, a service of presenting a television program could be executed by WatchTV application 462 with a set of parameters specifying the HBO to view HBO or with a separate set of parameters to view CNN. Each association of the application component (tune video) and one parameter component (HBO or CNN) represents a particular service that has a unique service I.D. The Client SAM 457 also interfaces with the resource manager 467, as discussed below, to control resources of the DHCT 16.

The PRM client application 477 preferably is downloaded into DRAM 452 from the head end 11. Alternatively, the PRM client application 477 may be resident in FLASH memory 451. Similar to an EPG application (not shown) that has an EPG database of records in which program information is supported by client-server EPG counterparts, the PRM client application 477 employs a first PRM database 481 of records that comprises information pertaining to PRM content for presentation to a subscriber. The first PRM database 481 contains sufficient information for the presentation of available PRM content at the current time and for subsequent periods. The PRM application server 319, in communication with PRM application client 477, effects updates to the first PRM database 481 stored in memory 449 or in a storage device (such as storage device 413) of DHCT 16. PRM application client 477 reads first PRM database 481 records and processes them into a displayable representation as part of a GUI presentation displayed on a television 441 or similar display device for presentation to a subscriber.

PRM content information associated with PRM content is transmitted on a regular or periodic basis from PRM application server 319 (FIG. 3) to one or more DHCTs 16. PRM content information may comprise descriptive information to populate the entries of a PRM guide, a service guide, or an EPG presentation with the corresponding PRM fields that are presented to the subscriber via a Graphical-User-Interface (GUI) from which a subscriber can select and request additional descriptive information about respective PRM content. Hence, per PRM content in the displayed presentation to the subscriber, the subscriber can retrieve and view (and hear if applicable) information specific to a PRM content title and proceed to purchase specific PRM content (i.e. one or more PRM content instances), as will be described in greater detail below. PRM content information comprises data organized into records of the first PRM database 481 with record fields containing, but not limited to, information such as PRM content title, PRM content description, PRM genre, release year, casts or performers list, ratings information, and play duration for each PRM content instance.

Application clients can also be downloaded into DRAM 452 at the request of the Client SAM 457, preferably in response to a request by the user or in response to a message from the headend 11. In one implementation, DRAM 452 contains a video-on-demand application (VOD) 463, an e-mail application 476, a PRM application 477, and a web browser application 475, among others. It should be clear to one with ordinary skill in the art that these applications are not limiting and merely serve as examples for one embodiment of the invention. Furthermore, one or more DRAM based applications may, as an alternative embodiment, be resident in FLASH memory 451. These applications, and others provided by the subscriber network television system operator, are top level software entities on the network for providing services to the user.

In one implementation, applications executing on the DHCT 16 work with the navigator 455 by abiding by several guidelines. First, an application utilizes the Client SAM 457 for the provision, activation, and suspension of services. Second, an application shares DHCT 16 resources with other applications and abides by the resource management policies of the Client SAM 457, the operating system 453, and the DHCT 16. Third, an application handles situations where resources are only available with navigator 455 intervention. Fourth, when an application loses service authorization while providing a service, the application suspends the service via the SAM (the navigator 455 will reactivate an individual service application when it later becomes authorized). Finally, an application client is designed to not have access to certain user input keys reserved by the navigator (i.e., power, channel +/−, volume +/−, etc.).

An executable program or algorithm corresponding to an operating system (OS) component, or to a client platform component, or to a client application, or to respective parts thereof, can reside in and execute out of DRAM 452 and/or FLASH memory 451. Likewise, data input into or output from any executable program can reside in DRAM 452 or FLASH memory 451. Furthermore, an executable program or algorithm corresponding to an OS component, or to a client platform component, or to a client application, or to respective parts thereof, can reside in FLASH memory 451, or in a local storage device coupled to DHCT 16 and can be transferred into DRAM 452 for execution. Likewise, data input for an executable program can reside in FLASH memory 451 or a storage device, for example storage device 413, and can be transferred into DRAM 452 for use by an executable program or algorithm. In addition, data output by an executable program can be written into DRAM 452 by an executable program or algorithm and can be transferred into FLASH memory 451 or into a storage device for storage purposes.

The security processor 565 is a secure element for performing security and conditional access related functions. More particularly, the security processor 565 functions to authorize the DHCT 16 of a paying subscriber to execute specialized functionality of the DHCT 16, such as receiving and decrypting (or descrambling) encrypted (or scrambled) media content and other data sent from a remote device. Security processor 565 preferably includes a microprocessor and a memory that only the microprocessor of the security processor 565 may access. Preferably, security processor 565 is contained in a tamper proof package. With reference to FIG. 3, in one implementation, encryption is applied to the data stream of the requested media content, for example the respective PRM content, at the QAM group 324 at the headend 11 according to encryption methods well-known to those of ordinary skill in the art. An encryption component resident in the QAM group 324 in the head end 11 and under the direction of the DNCS 323 encrypts, for example, MPEG-2 transport stream packets used to transmit the PRM content. The encrypted PRM content also includes, in one embodiment, entitlement control messages that are recognized by the security processor 565 (FIG. 4) at the DHCT 16 as information needed to decrypt the encrypted PRM content. Security processor 565 preferably stores authorization information, wherein the authorization information indicates that the subscriber is entitled to access the PRM content. The authorization information is obtained from one or more entitlement messages sent by the head end 11 after, or concurrently with, initialization of the DHCT 16 into a purchased service. If the authorization information indicates that the subscriber is entitled to the PRM content, security processor 565 generates a code word or key based on the authorization information and the received entitlement control message, and the security processor 565 uses this key to decrypt the encrypted PRM content at the decryptor 588 (FIG. 4).

In one embodiment, the DHCT 16 includes a primary storage device 413 and a secondary storage device 414. The ability to record programming on the primary storage device 413 provides a convenient method to temporarily buffer programming to fit a viewing schedule, however, in accordance with one embodiment, for economic reasons the systems will have a limited amount of primary storage. In one implementation, based on, for example, existing VCR usage patterns, there will be many occasions when the user will want to save or archive programs on the secondary storage device 414 for later viewing or archive the programs for later reference. The primary storage device 413 is preferably internal to DHCT 16 and in electrical communication to an internal main bus for communication with other DHCT 16 elements through a data interface 412 such as a SCSI or IDE interface. In other embodiments, the primary storage device 413 can be externally connected to (and thus removable from) the DHCT 16 via a communication port (for example, 474 or 475) such as IEEE-1394 or USB or via a SCSI or an IDE interface. The primary storage device 413 is preferably a hard disk drive. The primary storage device 413 exhibits fast seek-time and high data transfer rates properties and its storage medium is preferably non-removable, such as in the case of a hard disk drive. Because the amount of data in one or more downloaded instances of PRM content typically surpasses the memory space allocated for application data in memory 449, and because the primary storage device 413 features sufficiently large storage capacity, the primary storage device 413 serves, in one implementation, as a large repository or cache for downloaded PRM content. Alternatively, memory 449 may be large enough (and fast enough) to accommodate data transfers without the need for the primary storage device 413.

In one implementation, under the auspices of the real-time operating system 453 executed by processor 444, and in coordination with PRM application client 477, downloaded PRM content and/or data is received in DHCT 16 via communications interface 442 and stored in a temporary buffer in memory 449. The temporary buffer is implemented and managed to enable data transfers from the temporary buffer to the primary storage device 413 in concert with the insertion of a newly arriving PRM content into the temporary buffer. The fast access time and high data transfer rate characteristics of primary storage device 413 enables PRM content and/or data to be read from the temporary buffer in memory 449 and written to the storage medium of primary storage device 413 in a sufficiently fast manner. Orchestration of multiple simultaneous data transfer operations is effected so that while content and/or data is being transferred from memory 449 to primary storage device 413, new PRM content and/or data (herein media content) is received and stored in the temporary buffer. The coordination of data transfers and lower latency characteristics of primary storage device 413 enable PRM content to be received by DHCT 16 at high data rates. The primary storage device 413 functions to store media content that is received by the DHCT 16 from the headend 11 on an interim basis.

For permanent or semi-permanent storage, the secondary storage device 414 comprises a storage media drive, internally or externally connected to DHCT 16 in a similar fashion as the primary storage device 413, but featuring at least one high-capacity removable storage medium and, in one implementation, slower seek-time and lower data transfer rates characteristics. The secondary storage device 414 is preferably a multiple compact disc (CD) drive or multiple digital video disc (DVD) carousel or magazine drive that at least has write capability, but may also have read capability among other capabilities. Alternatively, the secondary storage device 414 may be a single CD drive or DVD drive with at least write capability, but may also have read capability among other capabilities, or a video recorder (VCR or D-VCR) or other data recorder. Alternatively, the carousel may be a magazine type. In one implementation, the media content that is received and stored on the primary storage device 413 is transferred by way of memory 449 to the secondary storage device 414 wherein it is written to one or more removable media residing in the secondary storage device 414. The transfer of PRM content from primary storage device 413 to secondary storage device 414 can occur concurrently to the download of the respective PRM contain in a coordinated sequential fashion or after the respective PRM content has been completely received and stored in the primary storage device 413. In the former case a second temporary buffer in memory 449 is utilized to implement the transfer of PRM content from the primary storage device 413 to secondary storage device 414. Given its faster seek time and higher data transfer rate characteristics, primary storage device 413 preferably operates faster than the secondary storage device 414. Alternatively, PRM content is transferred from memory 449 to the secondary storage device 414 with higher data rate transfer characteristics, or yet in other embodiments, PRM content is transferred from a remote server or other remote device to a DHCT 16 communication port and then directly to the secondary storage device 414.

Also as shown in FIG. 4, the DHCT 16 preferably includes access to a printer 458, either connected locally to the DHCT 16 or via a home communication network via communication port 474. In one implementation, the printer 458 prints labels to be applied to the removable media (i.e., CDs or DVDs) of the secondary storage device 414. Preferably, these labels convey, at least, verification of purchase and authenticity of the data written to the media. Thus, in one implementation, labels are printed by the printer 458 as a result of an execution signal received by the printer 458 from the PRM application client 477 as a result of an authorized purchase of PRM content in which authorization was granted from the head end 11. Alternatively, DHCT 16 may operate without the printer 458.

The PRM client application 477 configures the DHCT 16 for the download, purchase, and billing of downloaded purchasable recordable media (PRM) content, including configuring the DHCT 16 for receipt of trial and impulse purchases of PRM content. The PRM application client 477 also provides for a user interface for specification of downloading options in cooperation with PRM application server 319 (FIG. 3) and in cooperation with other client applications, for example VOD 463 and PPV 464 and Music applications (not shown). Alternatively, the user interface may be provided from the head end 11. Regarding the billing functionality, after a purchase transaction has occurred and the purchase is acknowledged, the purchase is recorded for billing purposes. In one embodiment, the PRM application client 477 configures the processor 444 to cause PRM purchase transactions to be stored in the FLASH memory 451 part of system memory 449 or in some other designated non-volatile memory section of DHCT 16 as purchase transactions occur. PRM transaction records and associated fees are transmitted upstream via the OOB upstream channel at designated scheduled times (e.g., during low bandwidth consumption periods) to the billing system 320. Alternatively, the PRM application server 319, under the direction of the billing system 320, may periodically poll individual DHCTs 16 or group of DHCTs to collect their respective PRM transaction history. PRM transaction records received from the DHCT 16 by the PRM application server 319 (FIG. 3) are debited from the respective account of the subscriber by the billing system 320.

The PRM application 477 also has library functionality for cataloging downloaded recordable media content. Media content information associated with PRM content is transmitted on a regular or periodic basis from PRM application server 319 (FIG. 3) to one or more DHCTs 16. PRM content information may comprise descriptive information to populate the entries of the first PRM database 481 or a service guide or the corresponding PRM fields of an electronic program guide (EPG) that is presented to the subscriber via a Graphical-User-Interface (GUI) from which a subscriber can select and request additional descriptive information about respective PRM content titles. Hence, per PRM content information in the displayed presentation to the subscriber, the subscriber can retrieve and view (and hear if applicable) information specific to a PRM content title and proceed to purchase specific PRM content, as will be described in greater detail below.

The PRM client application 477 can offer the user a plurality of category choices, wherein the user may select from pre-configured categories from an input device such as a wired or wireless keyboard or remote control to classify downloaded PRM content into various categories. Alternatively, the user may enter textual information with an input device in order to create his or her own categories. Hence, downloaded PRM content can be recorded with modified or additional category information. In an alternate embodiment, a user can either download from the PRM application server 319, or transfer from a personal computer connected to a home communication network, additional information such as graphical information or a still picture to be included with the recording of the PRM content into recordable media inserted in secondary storage device 414. PRM client application 477 functionality further includes second database 482 management capabilities in which records of second database 482 can be stored in memory 449, primary storage device 413, or in a recordable disc inserted in secondary storage device 414. Management of the second database 482 extends library functionality to the user for archiving PRM content as well as non-PRM content accessible via the secondary storage device 414 or a home communication network. Hence, the user is able to archive media content, perform searches (as extended by search capabilities inherent in the database management software program), and edit personal annotations such as the media content category, date recorded, etc. In one embodiment, subscriber network programming, such as for example cable programming, is first recorded/stored on the primary data buffer (for example, in primary storage device 413) which is indexed by content ID and record date/time information (i.e. meta data). The minimum content ID information collected is the originating channel number but could include program ID (PID) or other media content and media content description information. The record date/time information is simply the date/time the recording was made and is used by the system for data management/purge) and can also be used by the subscriber as one of several methods to locate previously recorded media content. The media content recorded in the primary buffer (for example, primary storage device 413) is available for viewing and disposition by the subscriber. Media content can be viewed, deleted, or spooled along with the data accessible by universal or widely adopted access and naming conventions (e.g., as is characteristically in meta data) to a secondary buffer (for instance, in secondary storage device 414) for longer term storage and playback. Media content left in the primary buffer are subject to be overwritten by new media content. In one embodiment, the secondary buffer is located on removable media that can be stored for future playback.

Figure 5:
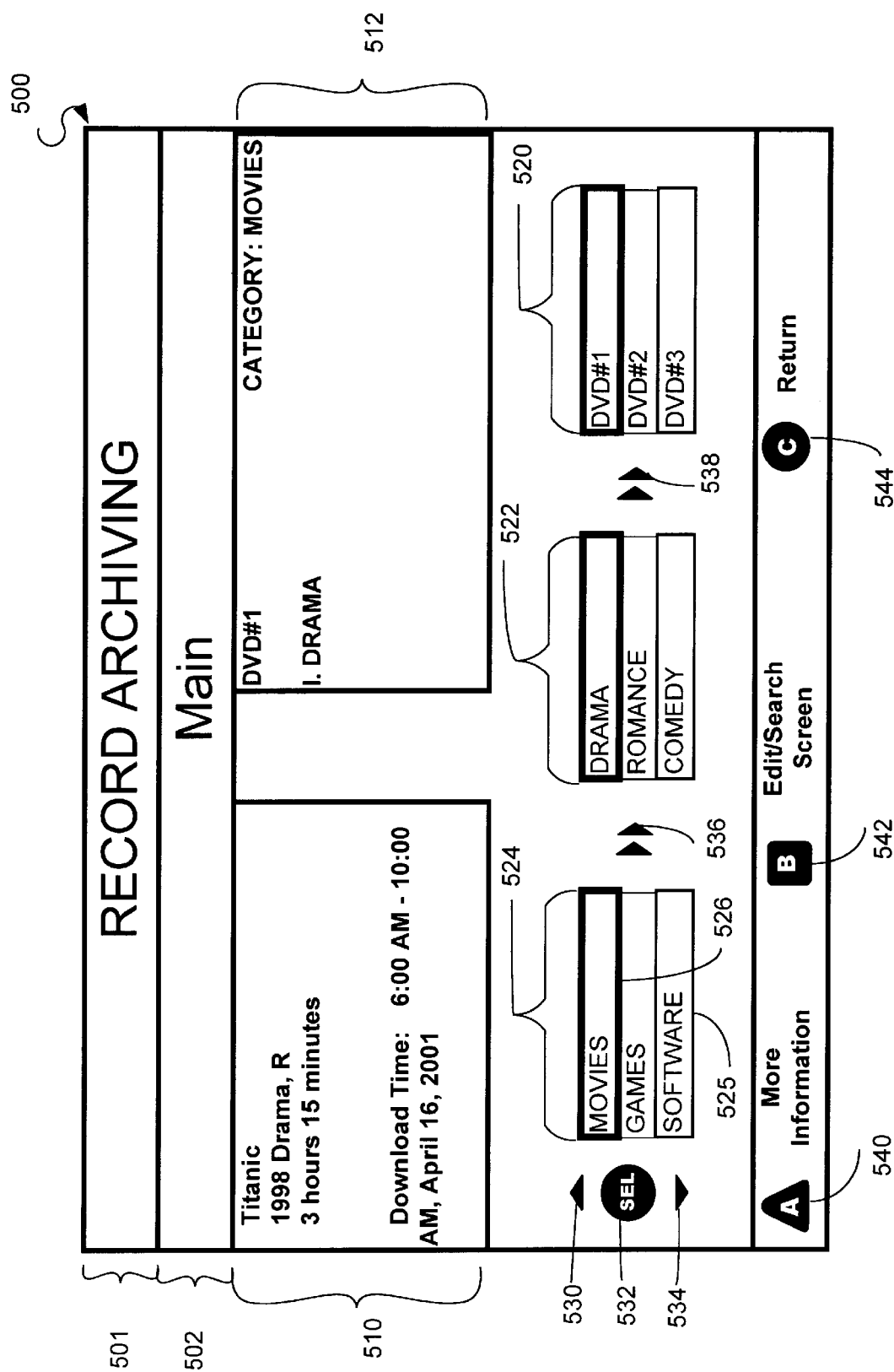
FIG. 5 is a screen diagram of an example archive main screen illustrating the archiving features for a first downloaded movie, in accordance with one embodiment of the invention.

FIG. 5 is an example archive main screen 500 illustrating the archiving features provided by the PRM application 477 (FIG. 4). Example archive main screen 500 is preferably invoked after the user has received a purchase acknowledgement. Alternatively, example main screen may occur at the time of the download, or after the download, before or after the transfer to the secondary storage device 414. The example archive main screen 500 includes a title header 501 suggesting to the user the purpose of the screen, and a subtitle header 502 indicating which hierarchical level of the archiving screen displays is currently displayed, in this instance, a main screen 500. Example main screen 500 includes an information window 510 that provides brief descriptive information, such as, for example, title, rating, date of composition, length of presentation, length of download and time and date of download. More or less information may be included. Example archive main screen 500 also includes several pre-configured lists, such as media content list 524, genre/descriptive list 522, and medium list 520. Each of these pre-configured lists includes information within a series of list entry blocks 525. The information in these lists will preferably be defaulted to the selection corresponding to the shown highlighted list entry block 526 of each list based on the characterizing information corresponding to the recordable media content selection. In one embodiment, this characterizing information can be received from the headend 11 to the DHCT 16 (FIG. 1) to enable the DHCT 16 to perform the archiving functionality. In other embodiments, this characterizing information need not be downloaded to a DHCT 16, but instead, can remain at the headend 11 where the archiving functionality can be performed. Thus, genre/descriptive list 522 changes accordingly to the subscriber selection of a respective entry in media content list 524. For example, the genre/descriptive list 522 changes to a display corresponding to games displays upon the subscriber selecting games in media content list 524. Other embodiments are possible, such as a configuration screen (not shown) wherein the user categorizes the downloaded media content according to his or her own personal definitions or classifications. As another example, media content list 524 includes such media content as movies, games, and software, as well as more media content options not shown. The default selection highlighted by highlighted list entry block 526 corresponds to the fact that the downloaded media content is a movie, for example, Titanic. Genre/descriptive list 522 defaults to "drama" as this corresponds to the characterizing information of the Titanic, which lists the genre of Titanic as a "drama". Although these are default selections, the user is free to scroll the highlighted list entry block 526 of each list to enter his or her own preference for a category. For example, despite the pre-configured genre categorization of Titanic (e.g. drama), the user may choose to categorize Titanic as a romance, and thus advance the highlighted list entry block 526 of the genre/descriptive list 522 to the list entry block 525 containing the "romance" selection. As with any of the lists shown and described on the current and subsequent screens, the user may advance from one selection to the next selection within a list by using the up and down arrow keys of the remote control device, as suggested by up arrow 530 and down arrow 534, as will be described in greater detail below. There are many variations of the scrolling function. Preferably, the user advances highlighted list entry block 526 in each list up or down to highlight the list entry block 525 containing the information desired. Alternatively, the windows in each list may be advanced through highlighted list entry block 526. The scope of the preferred embodiment of the invention is not limited to how the user advances to each list entry block 525. The user advances from one list, for example media content list 524, to another list, for example genre/descriptive list 522, by using scroll arrows on the remote, as suggested by scroll arrows 536. Scroll arrows 536 and 538 correspond to scroll arrows located on a remote device 480, as will be described in more detail below.

Figure 6:
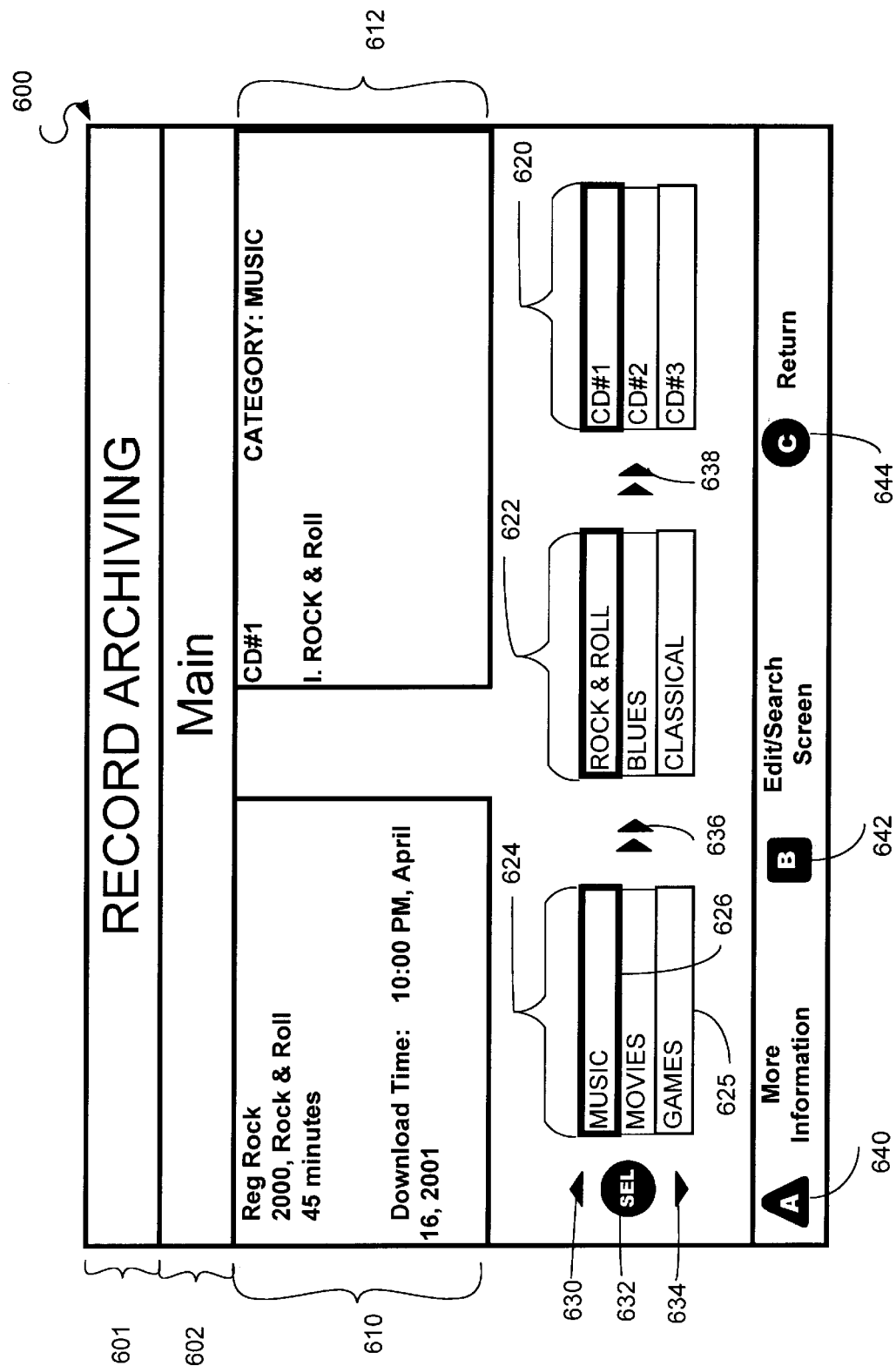
FIG. 6 is a screen diagram of an example archive main screen illustrating the archiving features for downloaded music, in accordance with one embodiment of the invention.

Category display 512 includes one example default format based on characterizing information corresponding to the purchased recordable media content. In this example, since Titanic is a "movie" of the "drama" genre, the category display 512 lists "drama" in an outline format and categorizes selections in this medium, DVD#1, as movies. Alternate formats may be displayed as well, such as personalized formats created by the user. The scope of the embodiments of the invention is not limited by how data is formatted on the screen displays. Assuming the Titanic purchase as the first purchased download by the user, the default will be to DVD#1. As illustrated, extended library functionality comprises the capability to not only to catalog media content but each individual medium (i.e., a CD disc or DVD disc) loaded in the carousel or magazine drive of secondary storage device 414 (FIG. 4) by the type (or category) of data stored on them. Category information may comprise, for example, types of music (such as classical, rock, or jazz), types of movies (such as comedy, drama, or horror), or types of software (such as games, word processing, or utilities). Sub-categories further delineate each category, for example, types of games. The library functionality determines if the appropriate disc is loaded in the secondary storage device 414 (FIG. 4) or prompts the user to load the secondary storage device 414 with the appropriate disc for the media content type that is to be recorded. For example, if rock & roll music, transmitted from the headend 11 to the DHCT 16, is being recorded, the library functionality will control the selection of the appropriate medium, for example a CD from the carousel or magazine of the secondary storage device 414, and load it into the drive for writing of the rock and roll music data to it, as shown in FIG. 6. As another example, if the user chooses to view a drama movie, the library functionality will control the selection of the proper medium, in this case a DVD, from the carousel or magazine of the secondary storage device 414 and load into the drive for reading of the drama movie data in order to transmit it to a display device, such as for example, a TV display 441 (FIG. 4).

Figure 7:
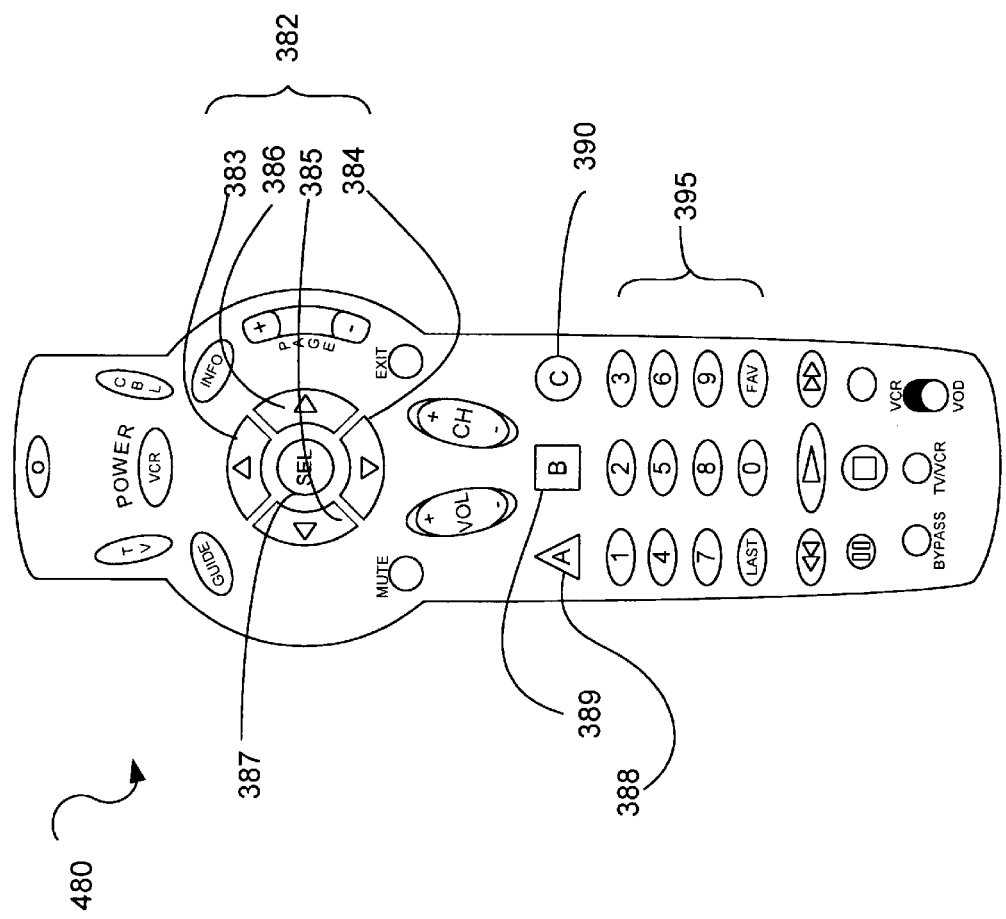
FIG. 7 is a block diagram of an example remote control device for providing input to the DHCT depicted in FIG. 1, in accordance with one embodiment of the invention.

In FIG. 6, the "A", "B", and "C" buttons on the example display screen correspond to like buttons on the remote control device 480 to provide certain user interface functionality. For instance, "A" button 640 suggests to a user that the user can request more PRM content information, as will be explained in greater detail below. The "B" button 642 suggests editing and search functionality, as will be described in greater detail below. Return Button "C" 644 suggests that the user can return to the main screen display wherein the purchase was made, for example a VOD catalog screen, or PPV screen. From the main screen display, the user can select "play" (not shown) to have the archived PRM content of his or her choice presented. The "SEL" button 632 suggests that the user can complete the archiving after making the selections in the pre-configured lists. Pressing the "SEL" button 387 (FIG. 7) on the remote control device 480, as suggested by select button 532 (FIG. 5), results in the example screen displayed in FIG. 8, as will be described in greater detail below. Buttons "A"–"C" (640, 642, and 644 respectively), arrow buttons 630, 634, 636 and 638, and "SEL" button 632 suggest a one-to-one functional correspondence to similar buttons on a remote device, such as the example remote control device 480 illustrated in FIG. 7. With continued reference to FIG. 6, FIG. 7 illustrates a block diagram example of a remote control device 480 that is used to provide user input to the DHCT 16. The arrow buttons 382 include an up arrow button 383, a down arrow button 384, a left arrow button 385, and a right arrow button 386 that are used to scroll through options or selections and/or to highlight an option or selection displayed on one of the plurality of user interface screens. The select button 387 may be used to select a currently highlighted option or selection that is provided to the user. Lettered button "A" 388, "B" 389, and "C" 390 may be used to implement functions on a user interface screen that have the corresponding letter. Numeric buttons 395 may be used to enter numbers, or configured with the application to enter letters corresponding to the numeric buttons 395. In describing the example screen displays, it will be understood that "selecting" or "pressing" the navigational and lettered buttons on the screen actually require selecting the corresponding buttons, or keys, on remote control device 480. Many alternative methods of providing user input may be used including a remote control device with different buttons and/or button layouts, a keyboard device, a voice activated device, etc. The embodiments of the invention described herein are not limited by the type of device used to provide user input.

Figure 8:
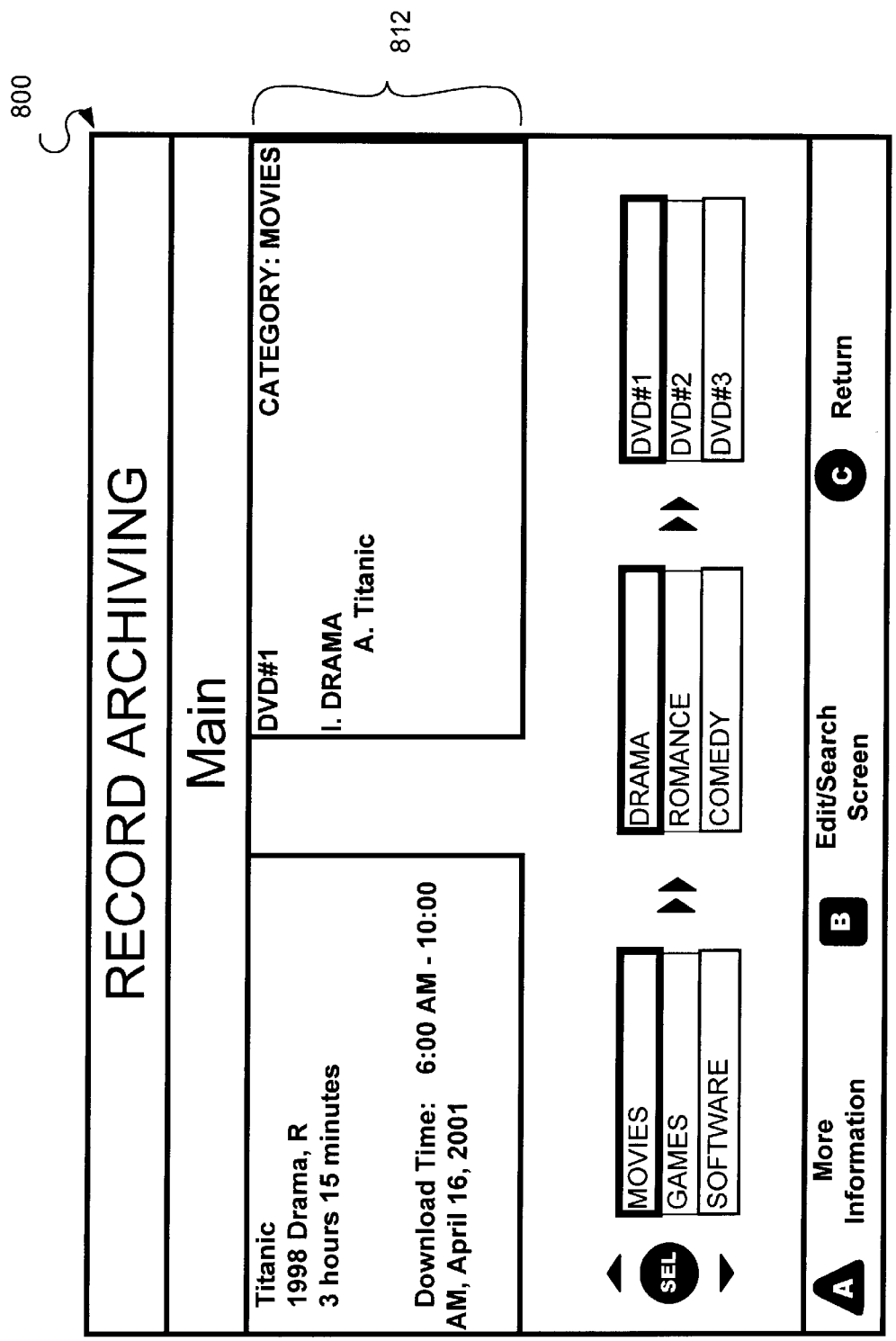
FIG. 8 is a screen diagram of an example archive main screen responsive to user input in the example archiving screen in FIG. 6, in accordance with one embodiment of the invention.
Figure 9:
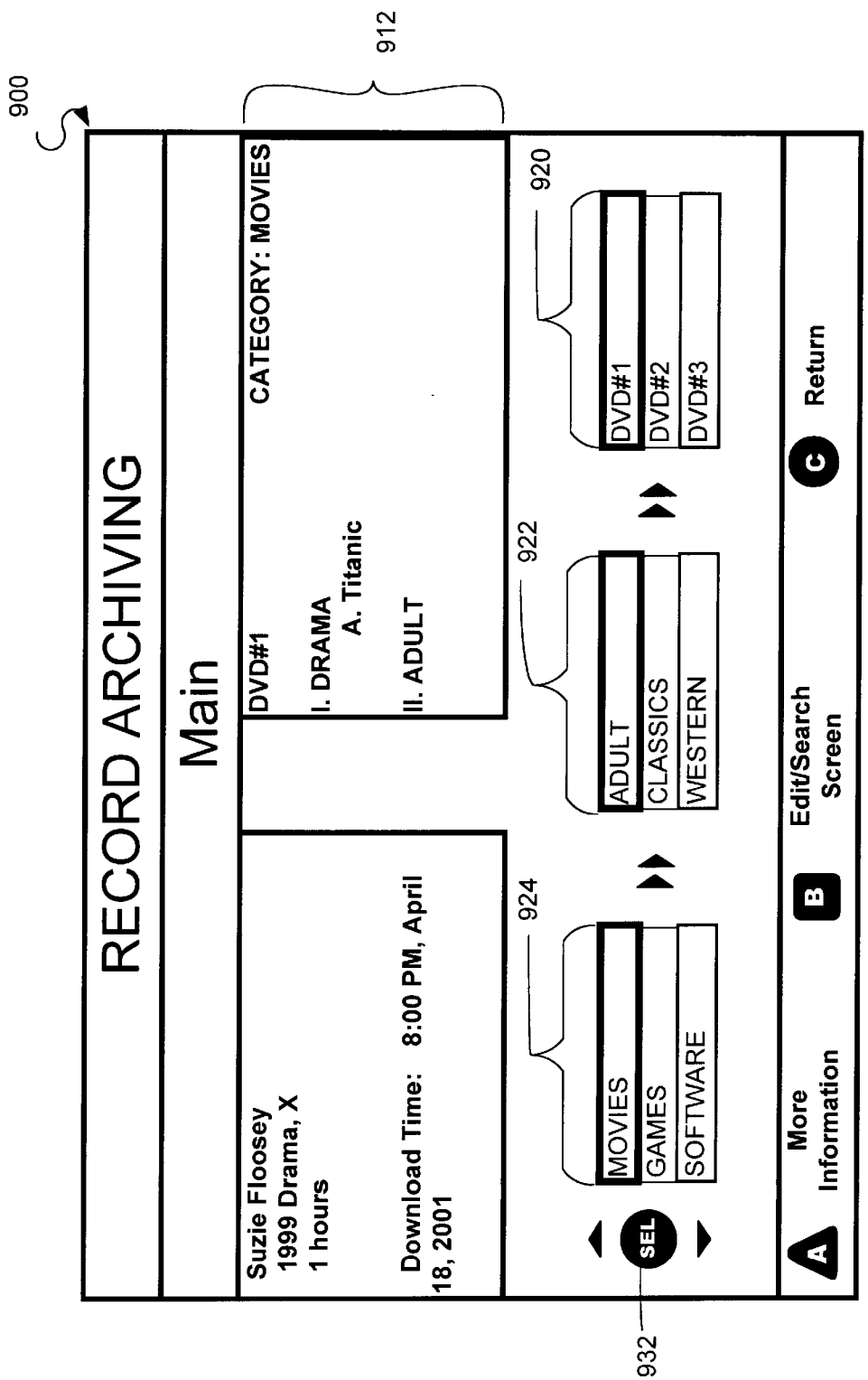
FIG. 9 is a screen diagram of an example archive main screen illustrating the archiving features for a second downloaded movie, in accordance with one embodiment of the invention.

FIG. 8 is a screen diagram that illustrates an example archive main screen 800 as a result of the user pressing the "SEL" button 532 in the archive main screen 500 (FIG. 5) to enter the movie Titanic under the "drama" subcategory in medium DVD#1. As noted, Titanic is displayed in category display 812 under the subcategory "drama" in outline format. FIG. 9 is a screen diagram that illustrates an example archive main screen 900 wherein the user has entered another purchase of recordable media content, in this case, Suzie Floosey. The PRM client application 477 (FIG. 4) recognizes Suzie Floosey as an adult movie from corresponding characterizing information delivered to the DHCT 16, and as similarly described above, defaults to each of these categories in the media content list 924 and genre/descriptive list 922. As DVD#1 was used for movies by the same user, the default medium in the medium list 920 is DVD#1. If the user purchasing the downloaded recordable media content was a different or second user, the default will preferably be to a different medium. For example, the default medium for the second user may be DVD#2, assuming no prior configurations by the second user, since characterizing information corresponding to the PIN entry of the user entered during the purchase of Suzie Floosey, as explained below, would reflect a different purchaser. Alternatively, the defaulted medium could be DVD#1, regardless of the purchaser, as the only DVD currently containing movie content, again assuming no prior configurations for movies. Note that the discussion regarding downloading to a DVD assumes that more than one movie may be downloaded to a DVD. In embodiments where the DVD allows only one movie to be downloaded, then the medium archiving aspect of said embodiment will select a distinct DVD per downloaded movie. Category display 912 displays the current content on DVD#1, and automatically creates, as a default, the "adult" subcategory to correspond with genre/descriptive list 922. As described earlier, the user may choose to describe the genre as a "romance", and scroll to the corresponding selection in the genre/descriptive list 922, whereby "romance" would appear in place of "adult" in the category display 912.

Figure 10:
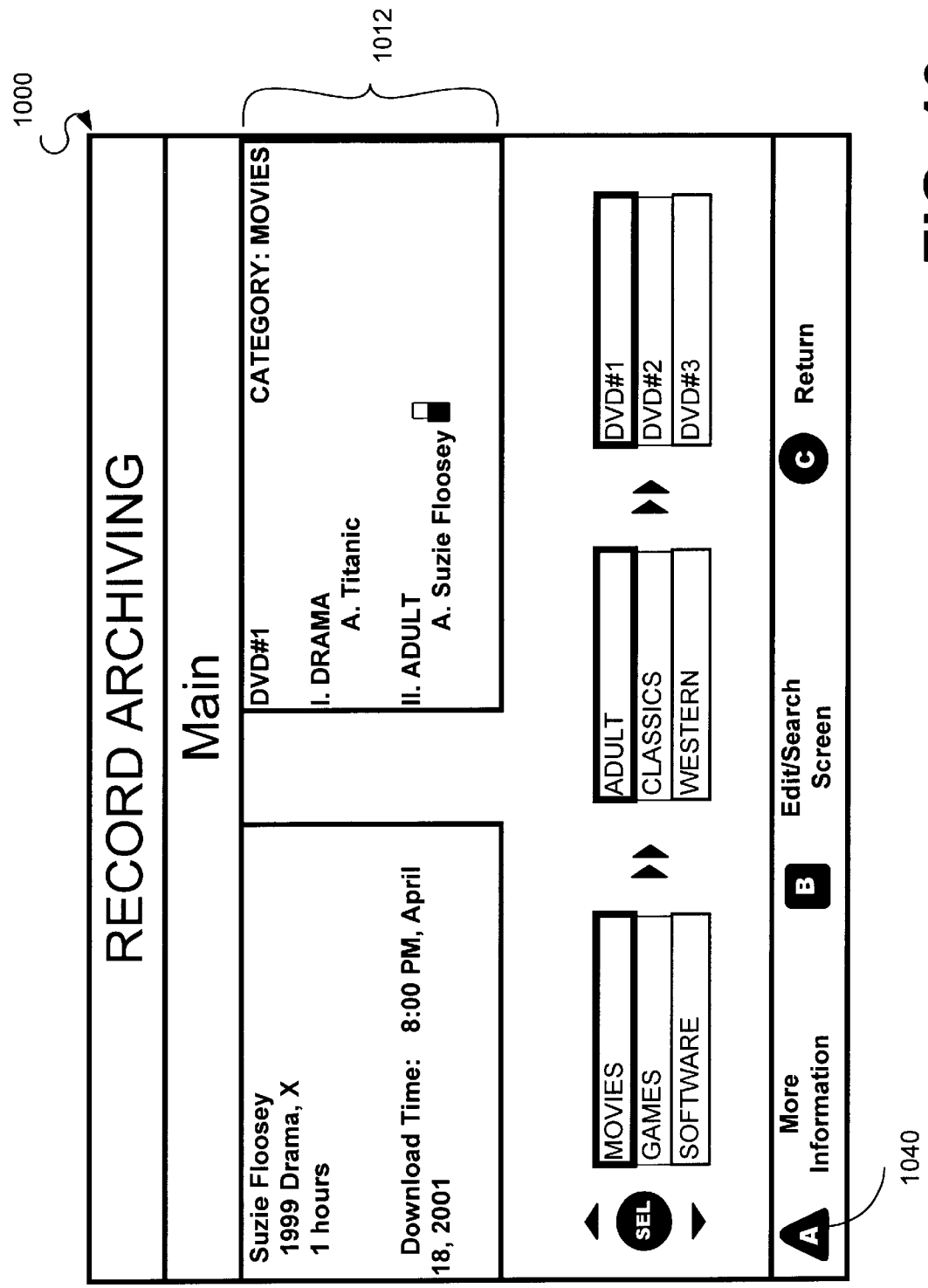
FIG. 10 is a screen diagram of an example archive main screen responsive to user input in the example archiving screen in FIG. 9, in accordance with one embodiment of the invention.

Upon the user entering the select button 932, example archive main screen 1000 in FIG. 10 is presented, with the feature Suzie Floosey displayed in the category display 1012 under the "adult" subcategory, with a lock or PIN icon next to it to reflect PIN access authorization to view this media content instance presentation. The PIN access feature would have been determined during the purchase process. The PIN access entry icon may be displayed as a result of the user entering a PIN access number to purchase the media content instance, in accordance with the rating of the movie. Alternative icons or warning notices or messages alerting the user to PIN access entry requirements may also be employed.

Figure 11:
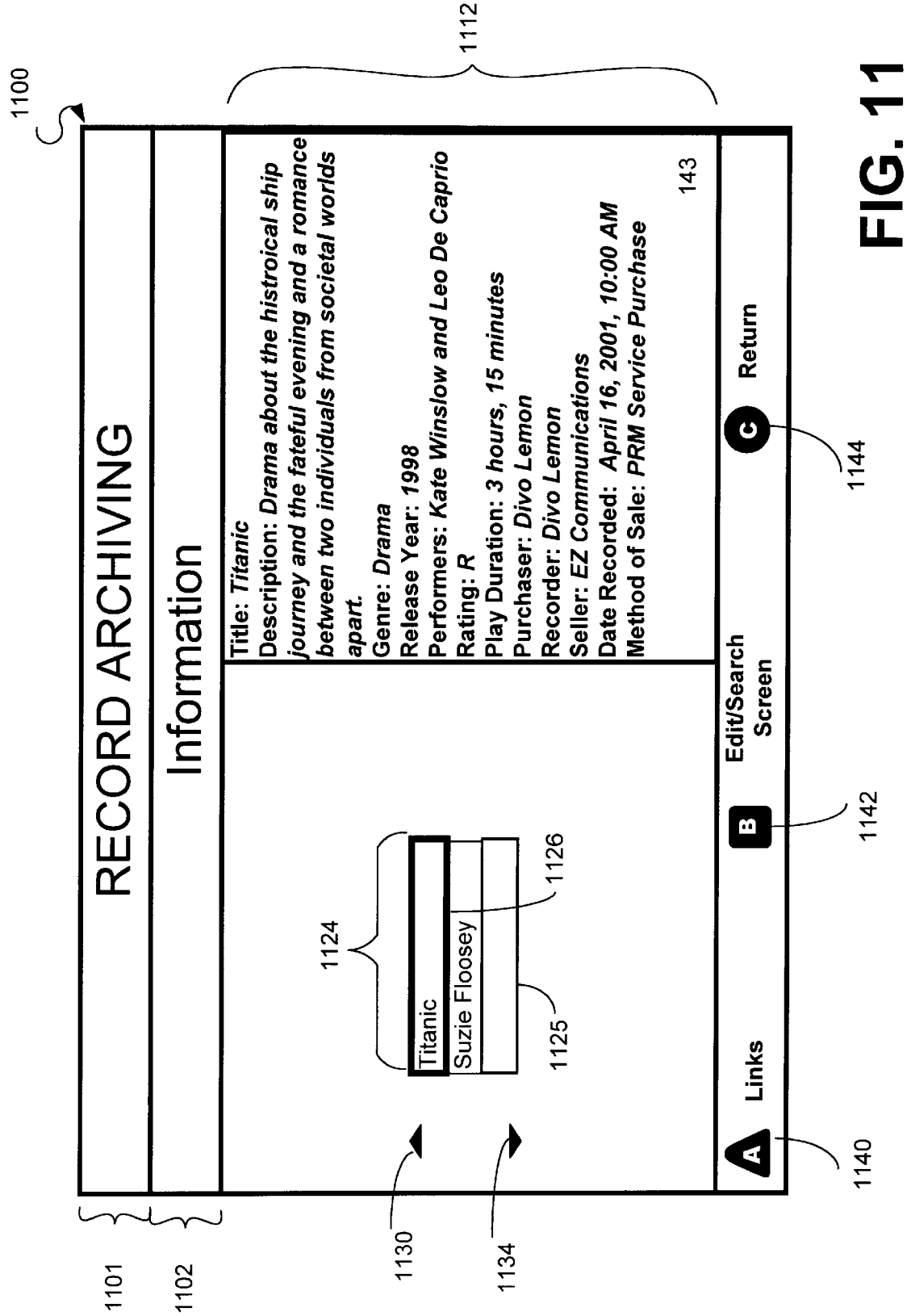
FIG. 11 is a screen diagram of an example archive information screen invoked from the example archive main screen depicted in FIG. 10, in accordance with one embodiment of the invention.

FIG. 11 is a screen diagram of an example archive information screen 1100 resulting from the user selecting the "A" more information button 1040 in prior example archive main screen 1000 in FIG. 10. Subtitle header 1102 reflects the fact that the user is currently in the archive information screen 1100. The user selects up arrow 1130 and down arrow 1134 to advance highlighted list entry block 1126 in selection list 1124 to the desired selection. Selection list 1124 includes the current selections in the current medium, for example, DVD#1. Information corresponding to the selection in highlighted list entry block 1126 in the selection list 1124 is displayed in the information display 1112 to the right of selection list 1124. PRM content information comprises data organized into records of first database 481 (FIG. 4) with record fields containing, but not limited to, information such as PRM content title, PRM content description, PRM genre, release year, casts or performers list, ratings information, and play duration. PRM content information also includes a plurality of prices (shown below) for each PRM content, with each respective price associated with a different downloading time and a download duration (shown below). PRM content information comprises additional information (not shown) such as a set of selectable downloading times with their respective price and respective approximate download durations. The effective window of calendar days in which respective PRM content is purchasable may also be included. Additional information may be included in aggregate fields to denote a PRM content instance rating and consequently support invoking parental control of media content via the PIN entry screen. Other fields designate information about the person that purchased and recorded the media content instance, the seller, the date purchased, the date recorded, and the method of sale (i.e., PRM purchase). Note that additional information about the highlighted selection in the selection list 1124 is available by selecting the "A" button 1140 to gain access to links to additional respective program related information such as program previews and the reviews and comments of critics. The user may select the "C" button 1144 to return to the archive main screen, for example, the archive main screen 1000 in FIG. 10, or the user may scroll to another selection in the selection list 1124, or the user may decide to search or edit prior configurations by selecting the "B" edit/search screen button 1142, as described below.

Figure 12:
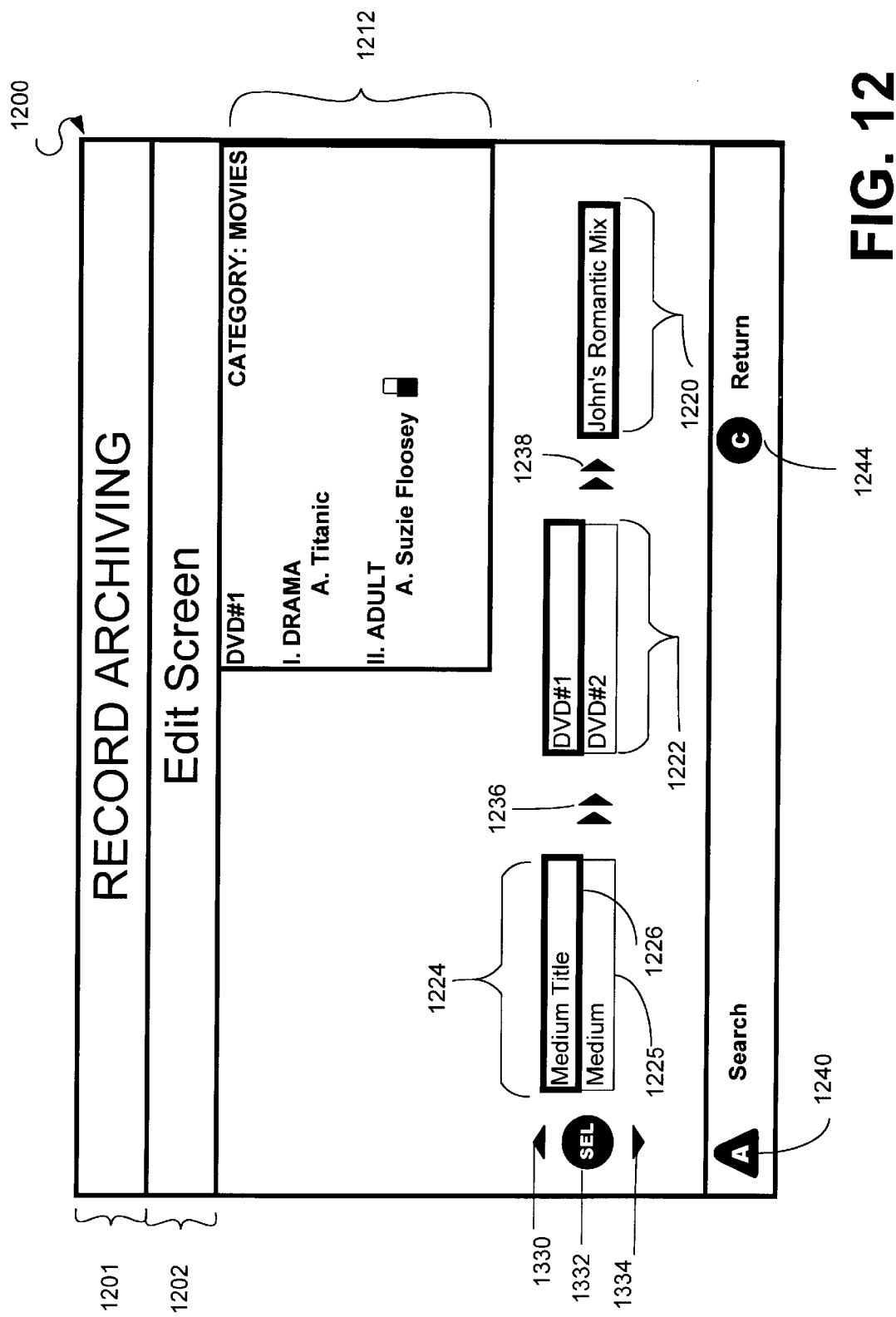
FIG. 12 is a screen diagram of an example archive edit screen invoked from the example archive information screen depicted in FIG. 11, in accordance with one embodiment of the invention.
Figure 13:
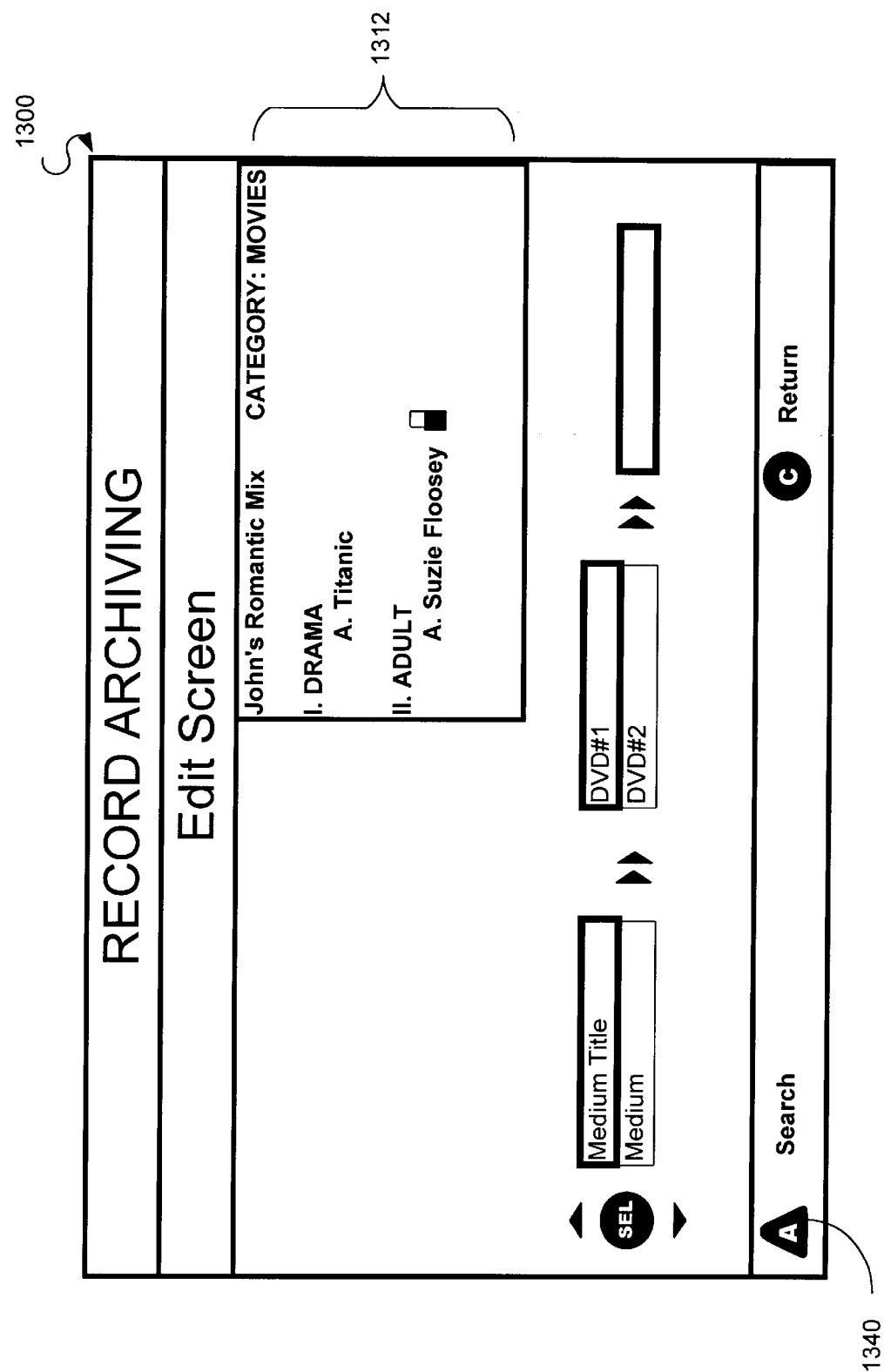
FIG. 13 is a screen diagram of an example archive edit screen resulting from user input in the example archive edit screen depicted in FIG. 12, in accordance with one embodiment of the invention.

FIG. 12 is a screen diagram of an example archive edit screen 1200 that extends library functionality by enabling a user to enter and/or edit certain personal annotations such as the media content category, date recorded, etc. Example archive edit screen 1200 includes header 1201 and subtitle header 1202, which together reflect the fact that the current screen is an archive edit screen 1200. Example archive edit screen 1200 includes a category display 1212 for displaying the current selections on the current medium. Example archive edit screen 1200 also includes an edit list 1224, wherein the various categories that may be changed are listed. Since the medium title is presumably a popular target for modification, it is the selection defaulted to. Also, since the current archive edit screen 1200 was invoked during the configuration for the DVD#1, DVD#1 is the highlighted default in the medium list 1222. For example, the user has selected "medium title" from the edit list 1224 as a category the user seeks to change. Using scroll arrows 1236, the user advances to the medium list 1222, which is highlighted at the default selection of DVD#1 as described above. The user again uses scroll arrows 1238 to advance to the input window 1220, wherein the user enters their personal title, "John's Romantic Mix" according to well-known methods for entering alphanumeric input on a remote device. FIG. 13 is a screen diagram of an example edit screen 1300 responsive to the entry of John's Romantic Mix" in the input window 1220 of FIG. 12, wherein the medium title displayed in the category display 1312 reflects the change in title.

Figure 14:
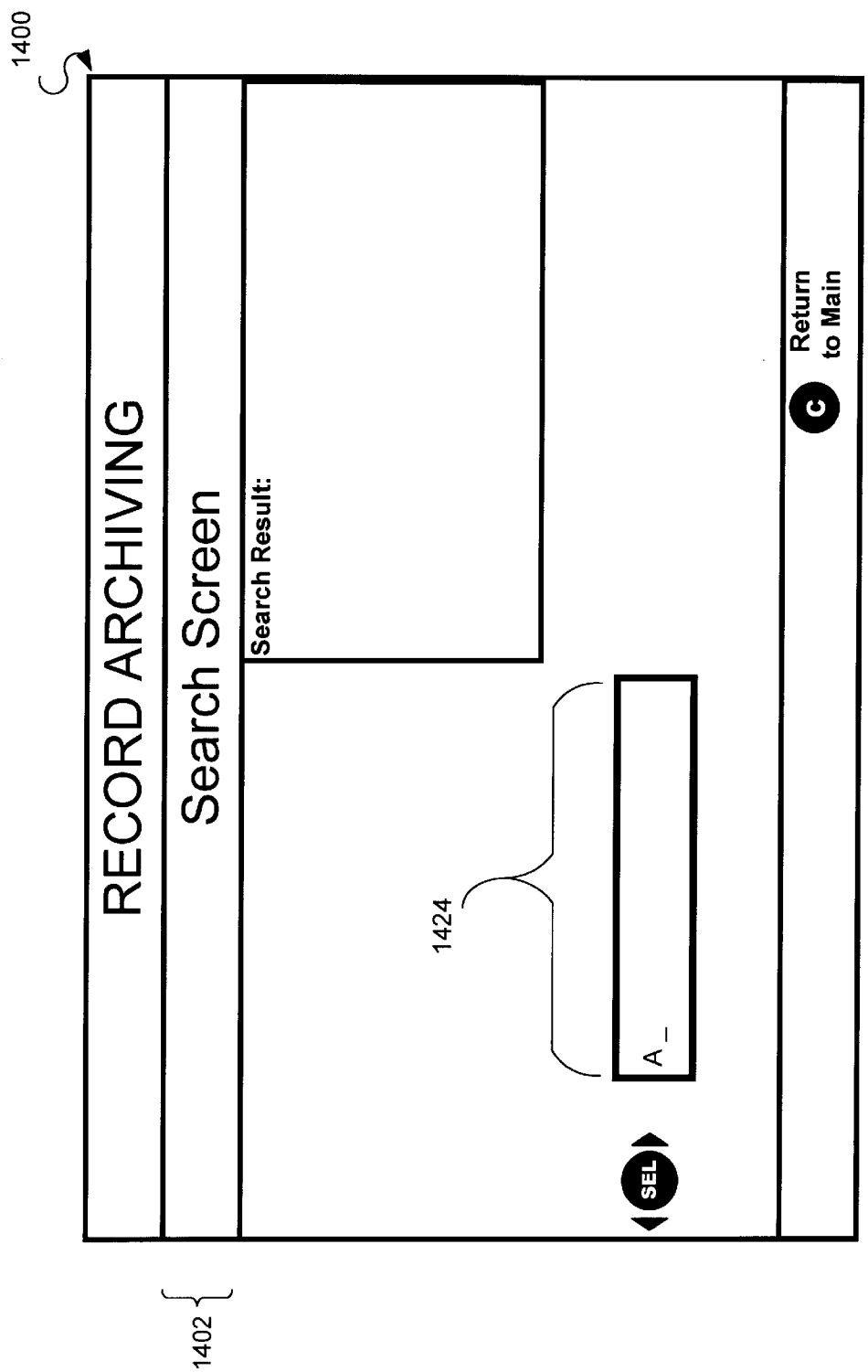
FIG. 14 is a screen diagram of an example archive search screen invoked from the example archive edit screen depicted in FIG. 13, in accordance with one embodiment of the invention.

FIG. 14 is a screen diagram of an example archive search screen 1400 responsive to the user selecting the "A" search button 1340 in the example archive edit screen 1300 of FIG. 13. Note the change in the subtitle header 1402 reflecting the current screen purpose. Search window 1424 enables the user to enter alphanumeric characters to search for media content or other information in any of the media available for secondary storage device 414 (FIG. 4). The user may enter the name of a title, or any of the PRM information and the result display 1412 will display the information and in which medium it may be located.

To offer PRM service, in one implementation, the subscriber network television system operator assigns a portion of the downstream and upstream bandwidth capacity in the subscriber network television system to be dedicated for transmission of PRM content. The amount of bandwidth capacity that can be allocated to the PRM service is finite. Grants for request to download PRM content may be limited during peak-time periods that correspond to high bandwidth consumption by a plurality of other services. On the other hand, off-peak-time periods may feature unused bandwidth capacity intended for other services that can be repossessed for downloading of PRM content.

In one embodiment, the amount of bandwidth capacity allocated for PRM service varies throughout time to reflect bandwidth consumption by a plurality of bandwidth consuming services, including but not limited to VOD services. During peak periods of other bandwidth consuming services such as, for example, video-on-demand (VOD), the amount of bandwidth capacity allocated to the PRM service is less than during the off-peak periods. Consequently, the duration for downloading a PRM content instance during peak-periods is typically longer than the duration for downloading a PRM content instance during off-peak-periods. For example, video on demand off-peak periods may run from 6:00 AM to 11:00 AM during the first week of May. Accordingly, the DNCS 323 (FIG. 3) at the headend 11 will allot bandwidth for downloading PRM content by repossessing the off-peak bandwidth assigned to video on demand services via a plurality of DTC 240 channels (FIG. 2).

In one embodiment, referring to FIG. 3, under coordination and communication between content manager 321 and PRM application server 319, PRM content is transferred from PRM application server 319 or other application servers (not shown) to VOD content server 322 via Ethernet connection 332 to effect PRM content delivery over repossessed unused bandwidth intended for VOD services. The DNCS 323 communicates the channel location where unused bandwidth is repossessed to subscriber DHCTs requesting PRM services (i.e. subscribers who have elected downloads of PRM content during these times) resulting in the tuner system 445 (FIG. 4) of a requesting DHCT 16 to tune to the corresponding channel to receive the downloadable PRM content.

In another embodiment of the invention, again referring to FIG. 3, under coordination and communication between content manager 321 and PRM application server 319, purchased PRM content that resides in the PRM application server 319 or in other application servers are transmitted for product delivery from the server wherein media content resides to the BFS server 328 via Ethernet connection 332. A particular PRM content instance may reside indefinitely in BFS server 328 due to the high demand of that particular content or content instance, or temporarily during times of unused BFS bandwidth. In another embodiment, introduction of new media content releases, such as games or audio content, may reside in the BFS server 328 for a finite period, such as a month, starting from their introduction time. Alternatively, PRM content may reside in a BFS server 328 for periods of times in which BFS server 328 exhibits unused bandwidth capacity.

Figure 15:
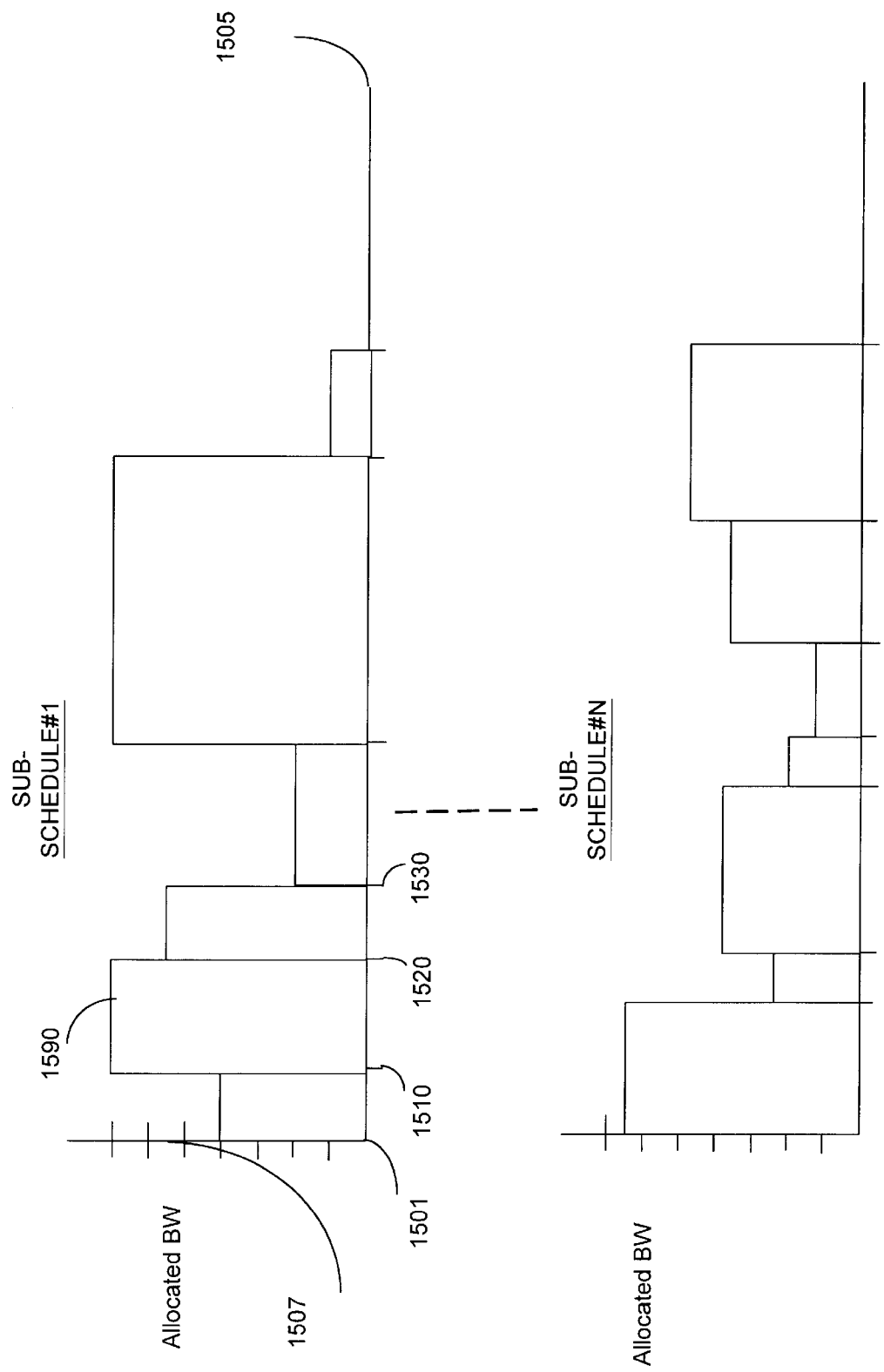
FIG. 15 is a block diagram illustration of sub-schedules invoked by the head end depicted in FIG. 3 for allocating bandwidth for downloading recordable media content, in accordance with one embodiment of the invention.

According to one implementation, bandwidth allocation for PRM service is managed according to a series of recurring sub-schedules consisting of a plurality of non-overlapping time intervals as illustrated in FIG. 15. "N" sub-schedules are illustrated in FIG. 15, with the understanding that a plurality of sub-schedules may appear between sub-schedule #1 and sub-schedule #n. Time intervals are demarcated by time marks 1510, 1520, etc on horizontal time axis 1505, and represent times within a 24 hour period. The interval between these time marks, such as between time marks 1510 and 1520, represent a period during the 24 hour period, for example, 12:00 AM to 4:00 AM. The time mark 1530, continuing the example, would represent 5:00 AM, and its interval will span to time mark 1540, which may be 8:00 AM. The corresponding bandwidth allotted during these time intervals is represented by the blocks over the corresponding time intervals, such as block 1590 over the second time interval bordered between time marks 1510 and 1520. Allocated bandwidth goes from, for example, zero 1501 at the intersection of the horizontal time axis 1505 and vertical bandwidth axis 1507 in sub-schedule#1 to increasing bandwidth when advancing up from zero 1501. Preferably, the time intervals vary in length and are established with demarcation according to collected historical data of bandwidth consumption patterns for a plurality of services. Allocation of bandwidth capacity may vary between one time interval to the next. Pricing for each respective PRM content instance may or may not vary in each of the respective time intervals according to whether the time interval is a peak period or not. For example, during peak periods, such as 6:00 to 10:59 P.M. of the week nights, the recurring schedule may exhibit higher pricing for PRM services whereas during certain, low-demand time periods such as 6:00 to 11:00 A.M of the weekend days the pricing will be lower. As disclosed below, other factors such as demand for new releases and popular media content may also influence pricing. Therefore, allocation of bandwidth capacity for PRM services may be configured to adapt in a time-specific manner according to a plan.

Figure 16:
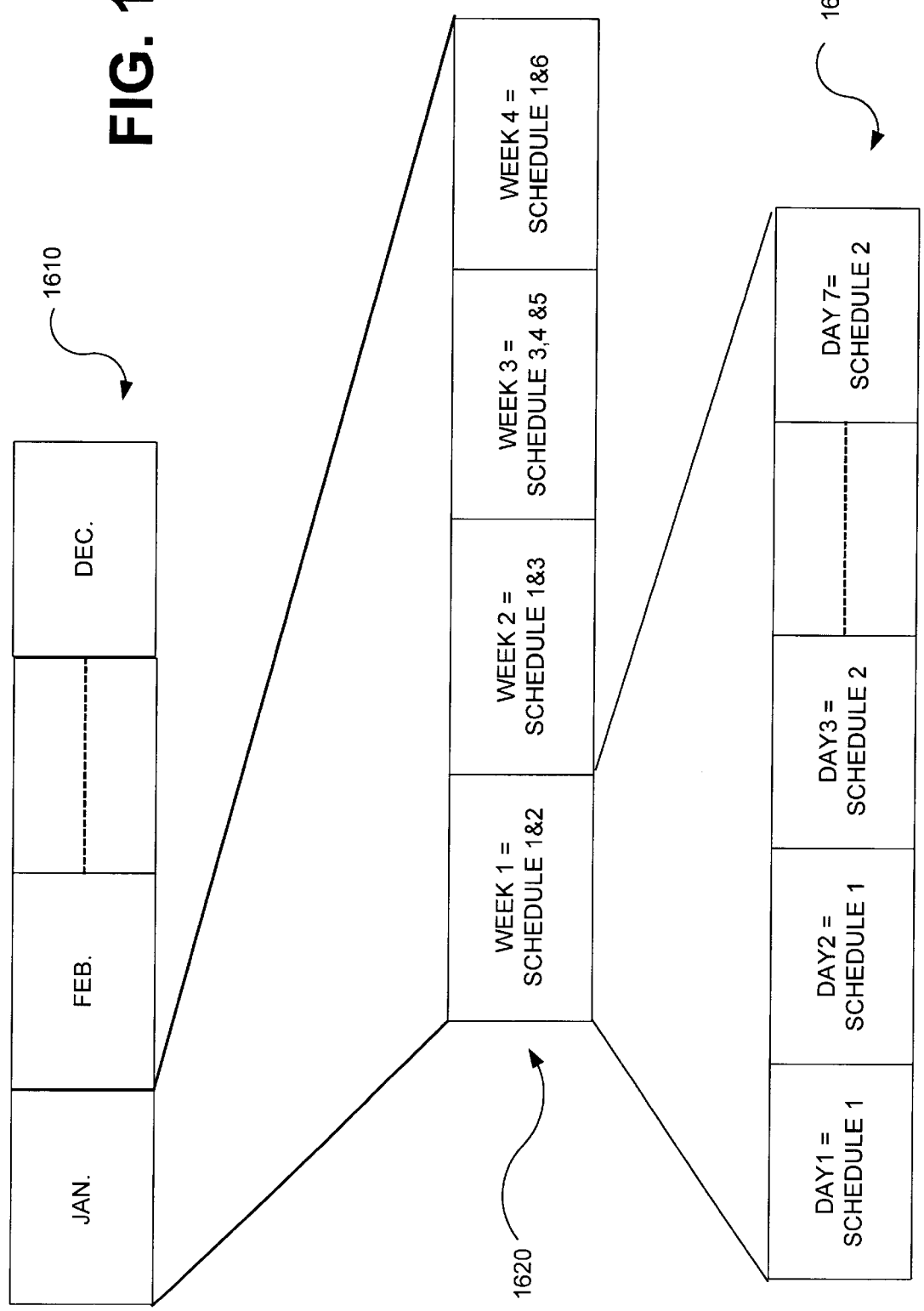
FIG. 16 is a block diagram illustration of the sub-schedule plan for implementing the sub-schedules depicted in FIG. 15 on a monthly, weekly, and daily basis, in accordance with one embodiment of the invention.

The allocated bandwidth PRM services may be configured to switch as time progresses from a first allocation sub-schedule to a second allocation sub-schedule according to a main schedule that specifies the time interval when each of two or more sub-schedules is to be active as illustrated in FIG. 16. As noted in FIG. 16, the plan may consist, in one embodiment, of scheduling for the year with multiple schedules 1610, further administered with fewer schedules on a per week basis 1620, and administered with even fewer schedules on a daily basis 1630. For example, only one configurable sub-schedule is active at a time throughout the configurable recurring schedule but a first configurable sub-schedule may be active throughout one or more distinct and non-overlapping time intervals of the configurable recurring schedule. The recurrence of the schedule is configured to one of a plurality of time periods such as a weekly, daily, or a monthly recurring schedule.

According to another possible bandwidth allocation schedule, a multiplicity of time-adaptive schedules for each of a multiplicity of recurring schedule choices are pre-configured. In this embodiment, the cable system operator may monitor the bandwidth and PRM service usage and be given the option of manually implementing one of the pre-configured allocation schedules without following a plan.

Alternatively, the DNCS 323 (FIG. 3) may automatically monitor bandwidth usage and automatically select one of the pre-configured schedules. For instance, six different configurations may be available for time-adaptive management of the bandwidth allocated for PRM services for a daily recurring schedule. On the other hand, more than six different arrangements may be necessary when implementing time-adaptive bandwidth management on a weekly recurring schedule.

The pricing system and the allocated bandwidth are inherently related, as the price structure will depend on, among other factors, the time of the download and the duration of the download. In a subscriber network television system that markets PRM content with a plurality of prices, a first subscriber may be willing to pay a premium to immediately download a PRM content instance that is purchased during a peak-period. A second subscriber pays a lesser purchase fee when purchasing a PRM content instance during a peak-period but selecting to downloaded the purchased PRM content instance at a later time corresponding to an off-peak period. In one embodiment, the PRM service offers a plurality of prices for a PRM content instance, and each respective price is associated with a different downloading time and a download duration.

In one implementation wherein VOD excess bandwidth capacity is employed to fulfill a PRM content instance purchase request, and with continued reference to FIGS. 3 & 4, a "session" between the DHCT 16 and the PRM application server 319 is set throughout the course of downloading the PRM content instance. Upon the subscriber purchasing a PRM content instance for a price via the displayed user interface (i.e. the subscriber enters input via an input device and such input may comprise a password or PIN to authenticate authorization to purchase the PRM content instance), as will be described below in greater detail, a purchase transaction is executed by the processor 444, as configured by the PRM application 477, that causes a session to be set-up between subscriber network television system resources to the DHCT 16. As facilitated by session manager 334 in DNCS 323 (FIG. 3), a session is a logical entity used to define a connection between the DHCT 16 and the VOD content server 322 and the resources used to maintain that connection in the subscriber network television system. Session manager 334 coordinates and effects the signaling required to implement the session which is preferably defined by the MPEG-2 standard ISO/IEC 13818-6 IS (MPEG-2 DSM-CC). Upon a session setup request generated by the DHCT 16 (usually in response to a request from a subscriber), the DNCS 323 verifies the eligibility of the DHCT 16 to receive the PRM service. The amount of bandwidth that will be reserved for the duration of the PRM service session is communicated to the relevant servers and headend 11 components. Via the messaging capabilities of DNCS 323, the PRM application server 319 sends a message to the DHCT 16 that indicates that it is ready to begin delivering the video content using the resources allocated. The DHCT 16 receives information in the message identifying the QAM modulator that is transmitting the video content (and hence where to tune to receive the requested content) and the bandwidth allocated to deliver the service. After a session has been established, the DHCT 16 communicates directly with the PRM application server 319 to facilitate delivery of the requested PRM service. Throughout the course of time that a PRM service is active, further messaging is conducted between the respective DHCT 16 receiving the PRM content and the PRM application server 319 to monitor the status of the session.

Figure 19:
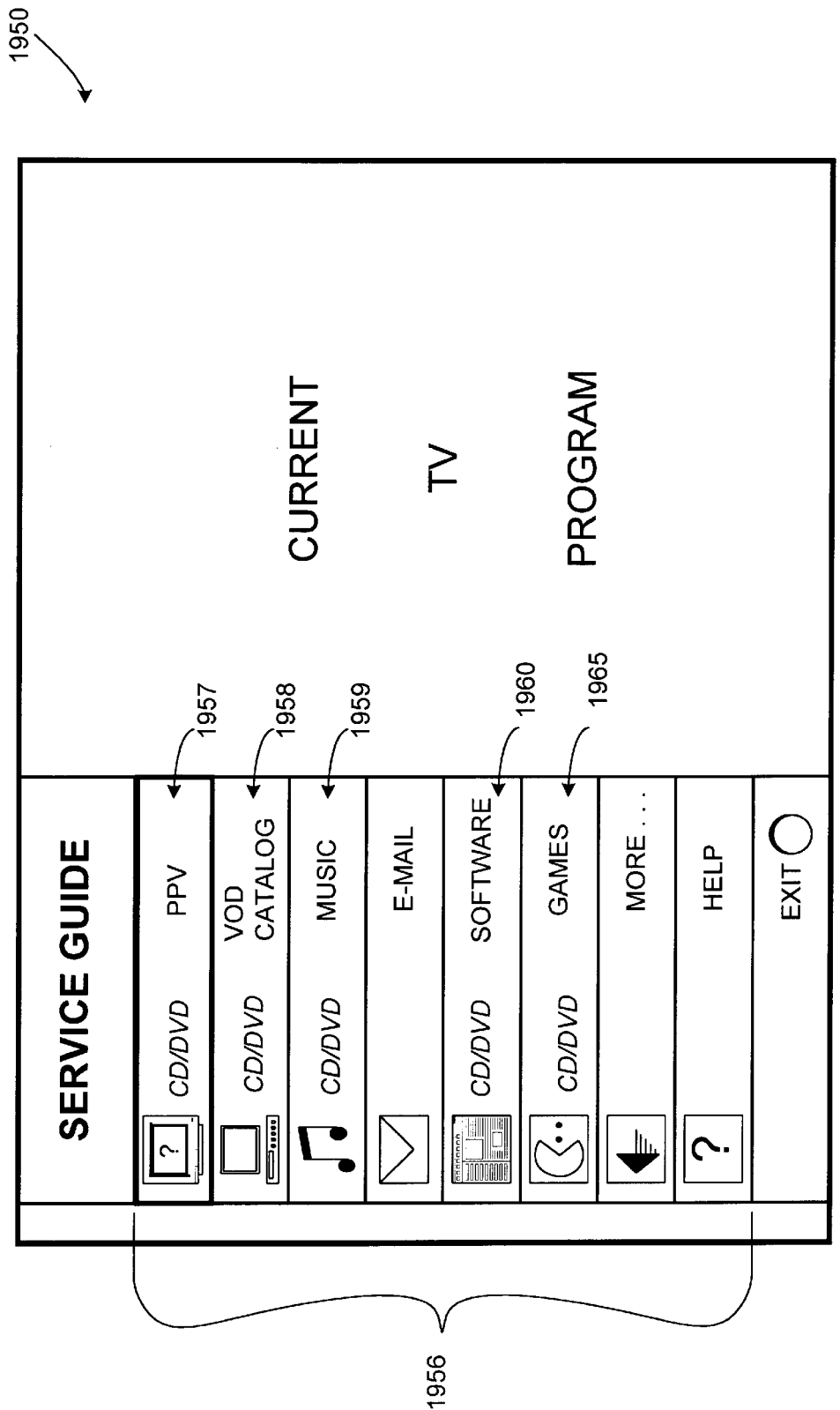
FIG. 19 is a screen diagram of an example service guide for accessing purchasable recordable media content, in accordance with one embodiment of the invention.
Figure 20:
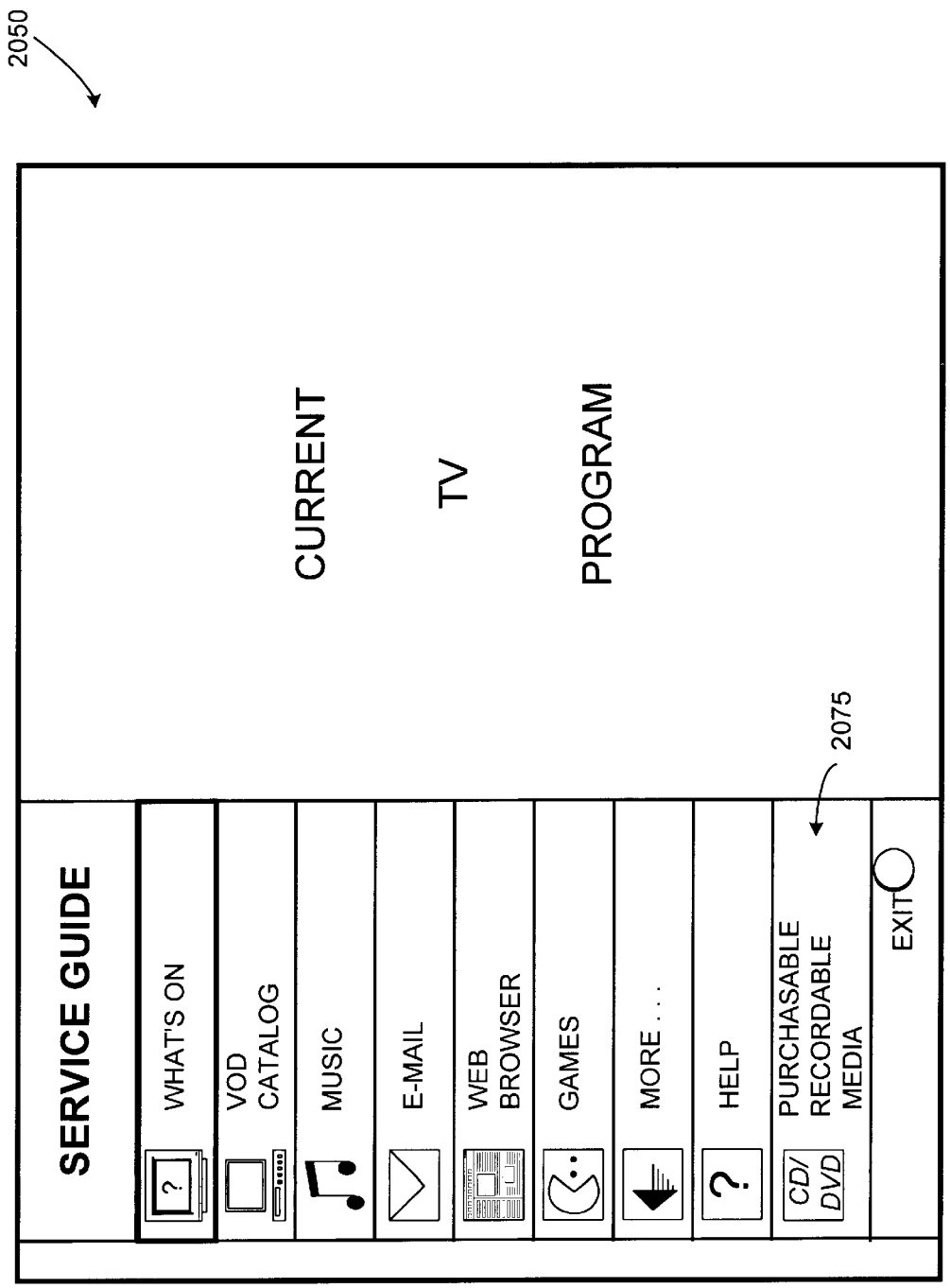
FIG. 20 is a screen diagram of an alternate embodiment of an example service guide for providing notice to the user that purchasable recordable media content is available, in accordance with one embodiment of the invention.
Figure 21:
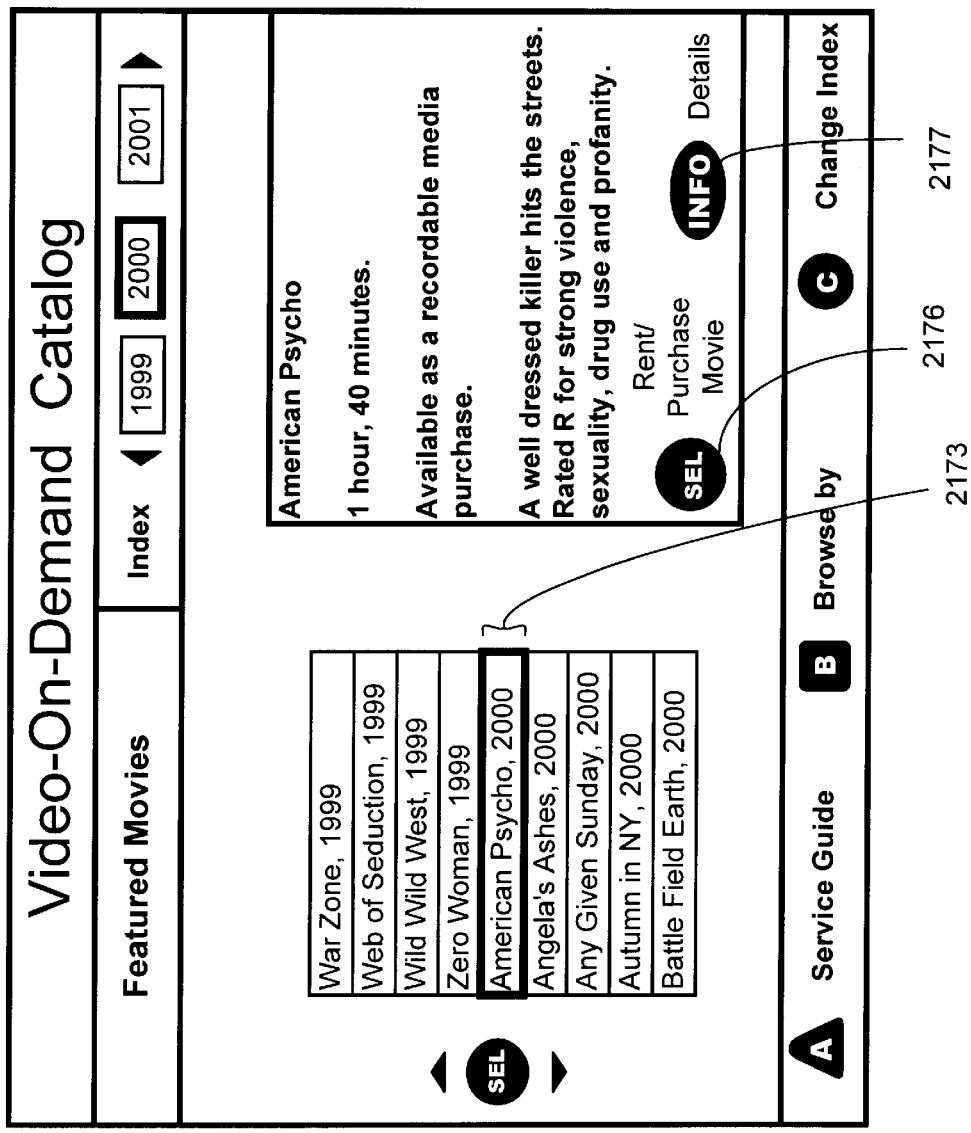
FIG. 21 is a screen diagram of an example video on demand catalog screen for enabling a user to choose purchasable recordable media content as part of a video on demand selection session, in accordance with one embodiment of the invention.

There are a variety of options available to the user for purchasing PRM content. In one embodiment, as illustrated in FIG. 17, the user is presented with an interactive program guide (IPG) 1770 which has PRM icons next to varied media content selections, suggesting to the user the availability of a downloadable and recordable option for those selections, as indicated in FIG. 17. The icons, and their screen coordinates, can be stored locally as an attribute in each program (i.e. media content) record, like stereo or second audio program (SAP) attributes. The program records can be stored in a database in the DHCT 16, for example an EPG database or first PRM database 481. Alternatively, the program records can be maintained at the headend 11. Any application can display the icon after, for example, the program title in the applications' GUI presentation (e.g. IPG application 1770). For example, selections Saving Private Ryan and American History under the PPV category 1776 have icon "CD/DVD" next to them suggesting to the user that these selections are available for downloading to a recordable medium, such as a CD or DVD. In another embodiment, the user may be presented with a service guide (SG) option 1876 such as the example IPG 1890 depicted in FIG. 18. Upon selecting the service guide (SG) option 1876, the user is presented with service selections in a service guide (SG) as illustrated in FIG. 19. FIG. 19 is a screen diagram of an example user service guide (SG) that provides for a plurality of services 1956 with CD/DVD icons to alert the user to the ability (or inability) to purchase recordable media content. For example, the CD/DVD icon next to the PPV 1957, VOD 1958, Music 1959, software 1960, and Games 1965 services suggests to the user that these services include selections that are downloadable to a recordable medium. Alternatively, the PRM service 2075 may be a selectable service entity, as illustrated in FIG. 20. Selecting the PRM service 2075 from the service guide 2050 may present various media content options that are purchasable recorded media content, categorized, for example, in media content categories such as music, movies, software, etc. FIG. 21 is a screen diagram of an example VOD selection screen display 2170 responsive to the user entering the VOD catalog selection 1958 in the example service guide 1950 in FIG. 19. A similarly formatted screen may be presented, for example, if the user selects from the service guide 1950 (in FIG. 19) a PPV selection 1957, or music selection 1959, or software selection 1960. Referring to FIG. 21, the user is presented with a screen display 2111 that includes a select button 2176, which provides the user the ability to rent or purchase the highlighted selection 2173. By pressing the select button 2176, the user is presented with a user interface screen (not shown) that provides the user with an option to either download (purchase) the selected item for recording and thus for indefinite personal possession (i.e. buy), or rent. The PRM service is also integrated into the VOD catalog, in one embodiment, as another option (like price). In one implementation, the system operator may choose what VOD content is available for PRM service and then programs the headend 11 accordingly. In another implementation, the content provider may offer certain VOD content with PRM service, which is then a feature provided to the user through the headend 11. Once the user selects the download option (not shown), the user will be presented with the example PRM service screen illustrated in FIG. 23, and which will be described below. Note that the screen display 2111 also includes an information button 2177, which enables the user to learn more about the selection they seek to purchase or rent. If the user selects rent, conventional VOD processing occurs.

Another segue into the pricing system may be by way of an impulse purchase made available during the presentation of a particular media content instance. For example, the user may presented with a pop-up message anytime during the presentation of a VOD movie or a PPV event, which asks the user if he or she would be interested in purchasing this event as PRM content. The pop-up message may occur as an overlay on presented media content in the display screen, or the media content presentation window may narrow to allow the message to appear, or any other manner to present the message on the display screen.

Figure 22:
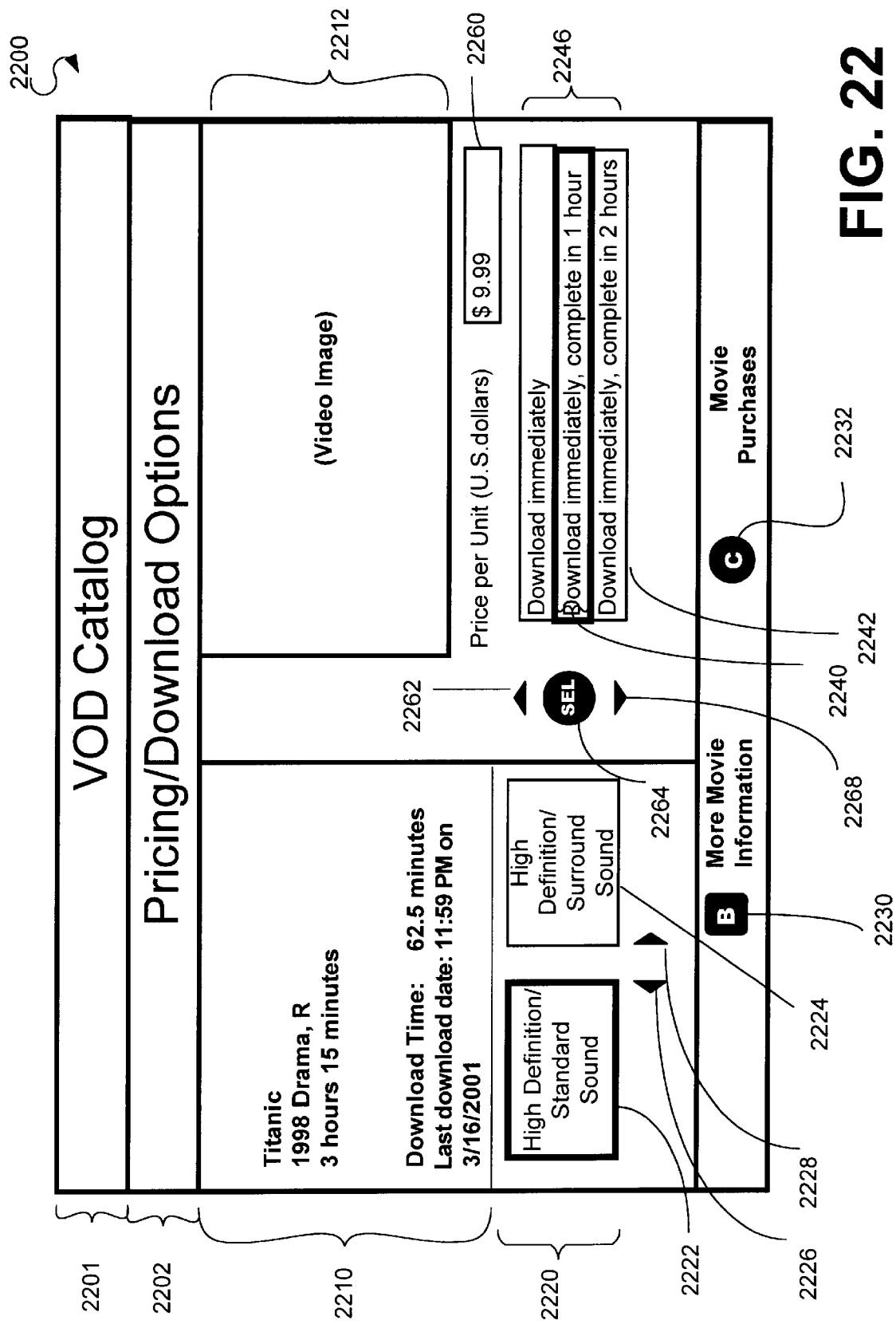
FIG. 22 is a screen diagram of an example purchasing screen for purchasable recordable media content as part of a video on demand selection session, in accordance with one embodiment of the invention.

Once the user has decided on a media content selection for downloading, either by entering a selection in an IPG, a service guide, or during the presentation of a particular media content instance as part of an impulse purchase, the user is presented with an example purchase screen 2200, as illustrated in FIG. 22. In one embodiment, this purchase screen 2200 may be invoked as a mini-program located within the PRM application 477 "called" by another application, for example, during a VOD session when the user has selected the purchase option over the rental option, or during a media content instance presentation from a service upon the user requesting an impulse buy. Alternatively, PRM application 477 functionality may exist as a sub-routine within the current media service application in session. Alternatively, PRM functionality may exist as software in the headend 11. Purchase screen 2200 includes title header 2201 identifying the media service from which the PRM content instance will be purchased. Subtitle header 2202 suggests the purpose of the purchase screen 2200, which is to select download and price options. The reduced screen area 2212 displays an image from the media content to be purchased. Assuming that the movie selection was Titanic, a picture of a representative scene for the highlighted movie may be presented. Similarly, pictures of representative spreadsheets from a software selected may be displayed, or a picture of a song artist may be displayed for the music selection, all mentioned by way of example. Information section 2210 contains some characterizing information about the media content purchase, including but not limited to media content title, date of composition, rating, download time, and available purchase window. Content quality index 2220 provide the user with content quality options, such as, for example, high definition television or standard definition, surround sound, etc. As with other user interface screens described previously, the user preferably advances highlighted window 2222 over a window 2224 containing the desired content quality by using left scroll arrow 2226 or right scroll arrow 2228. Selections preferably advance until an end is reached in the list, or alternatively, selections may "wrap-around" in a manner whereby the selections repeat themselves. Download option list 2246 contains download options. The user advances the highlighted list entry block 2240 over the list entry block 2242 containing the desired download option by using up arrow 2262 and down arrow 2268, and a corresponding price for that option and content quality is displayed in the price window 2260. The user presses the select button 2264 to purchase the desired selection. The user may select the "B" more movie information button 2230 to learn more details about the movie the user is about to purchase. The user may also select the "C" movie purchases button 2232 to return to the main media content screen, for a example, the VOD catalog screen as illustrated in FIG. 21, to consider other movie purchases.

The price assigned to each available download option may depend on a number of factors. Demand for a PRM content instance such as for new releases and popular media content instances may influence pricing. The amount of bandwidth consumed to download the PRM content instance (and hence the download duration), the time of day, the day of the week (weekday, weekend, or holiday), and the amount of time that the subscriber has to wait until the downloading operation starts also influence the price. Other factors influencing pricing of a PRM content instance include the PRM content type (e.g., audio, movie, or game), the PRM content quality (e.g., CD quality or surround sound quality audio; standard or high-definition picture quality), and the delivery mode (e.g., repossessed VOD excess bandwidth or via BFS services). For example, in the example purchase screen 2200 of FIG. 22, the user highlights an immediate download option, but with a latent duration ending an hour from the purchase as noted in download option list 2246. Further, the user has indicated a desire for high definition video with standard sound as indicated by the highlighted content quality window 2222. Price window 2260 shows that the resultant price for this price configuration is $9.99.

Figure 23:
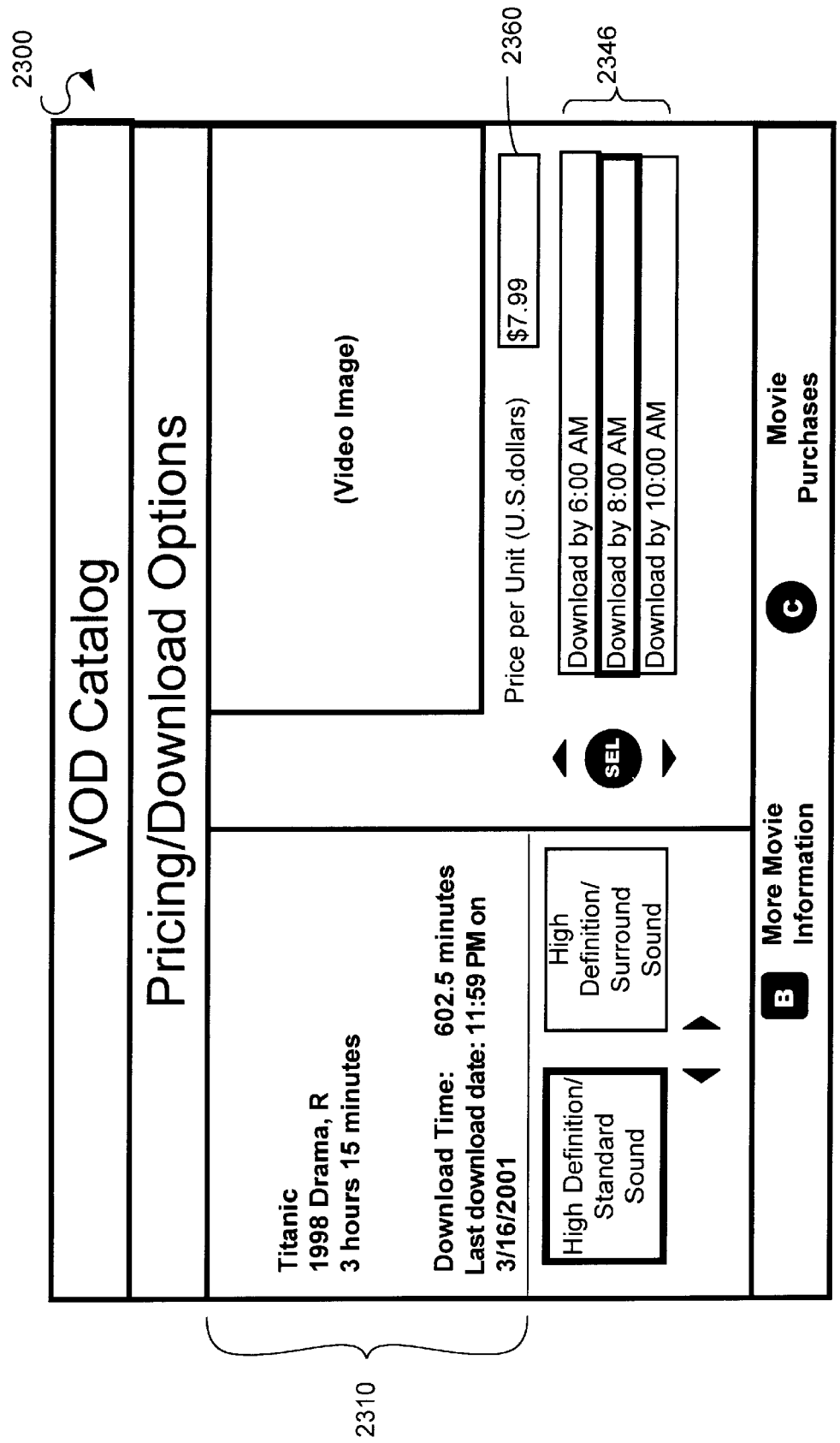
FIG. 23 is a screen diagram of an example purchasing screen for purchasable recordable media content, displaying a different download option from the option presented in the example purchasing screen of FIG. 22, in accordance with one embodiment of the invention.
Figure 24:
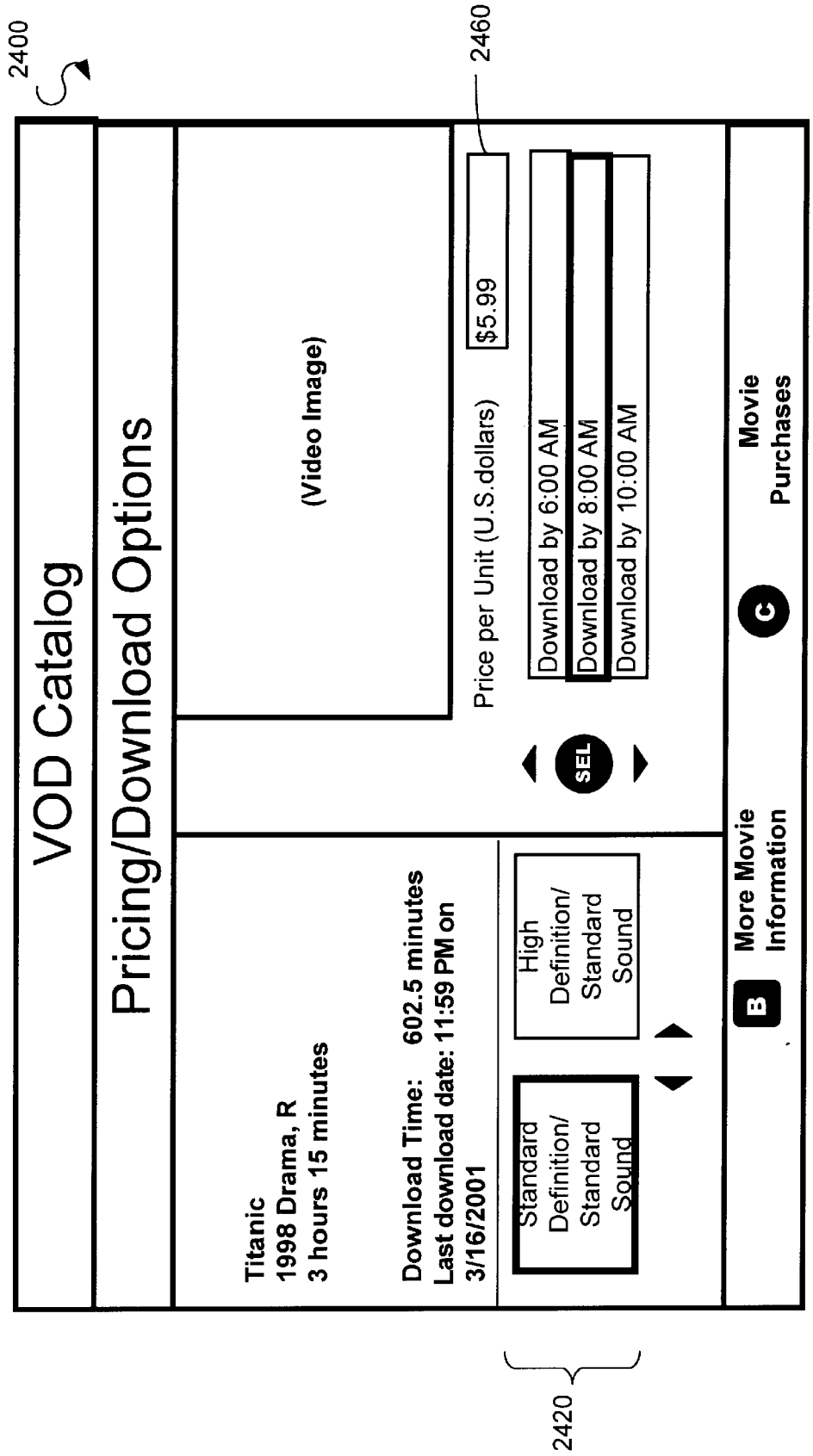
FIG. 24 is a screen diagram of an example purchasing screen for purchasable recordable media content, displaying a different content quality option from the option presented in the example purchasing screen of FIG. 23, in accordance with one embodiment of the invention.
Figure 25:
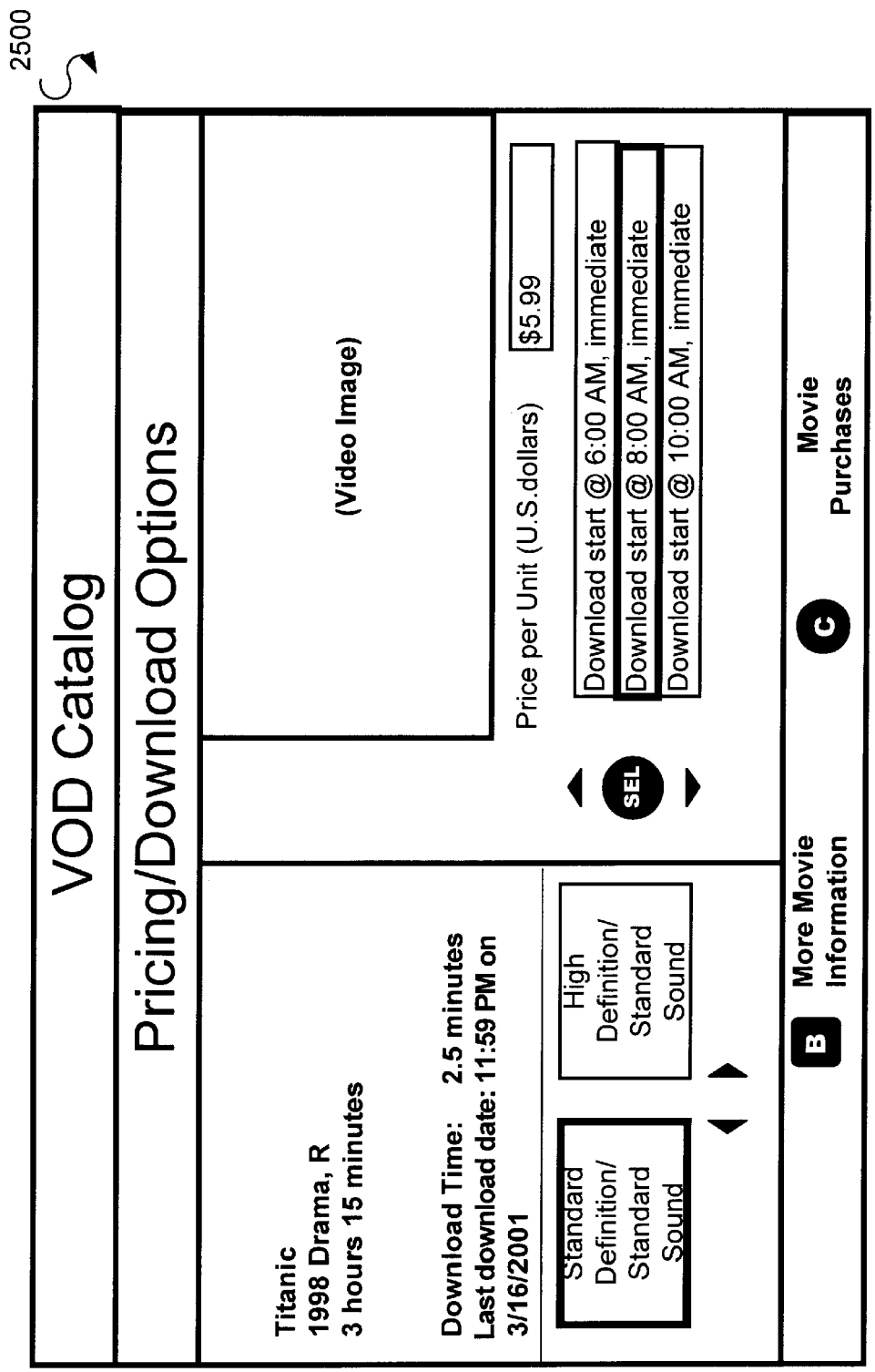
FIG. 25 is a screen diagram of an example purchasing screen for purchasable recordable media content, displaying a different download option from the option presented in the example purchasing screen of FIG. 24, in accordance with one embodiment of the invention.
Figure 26:
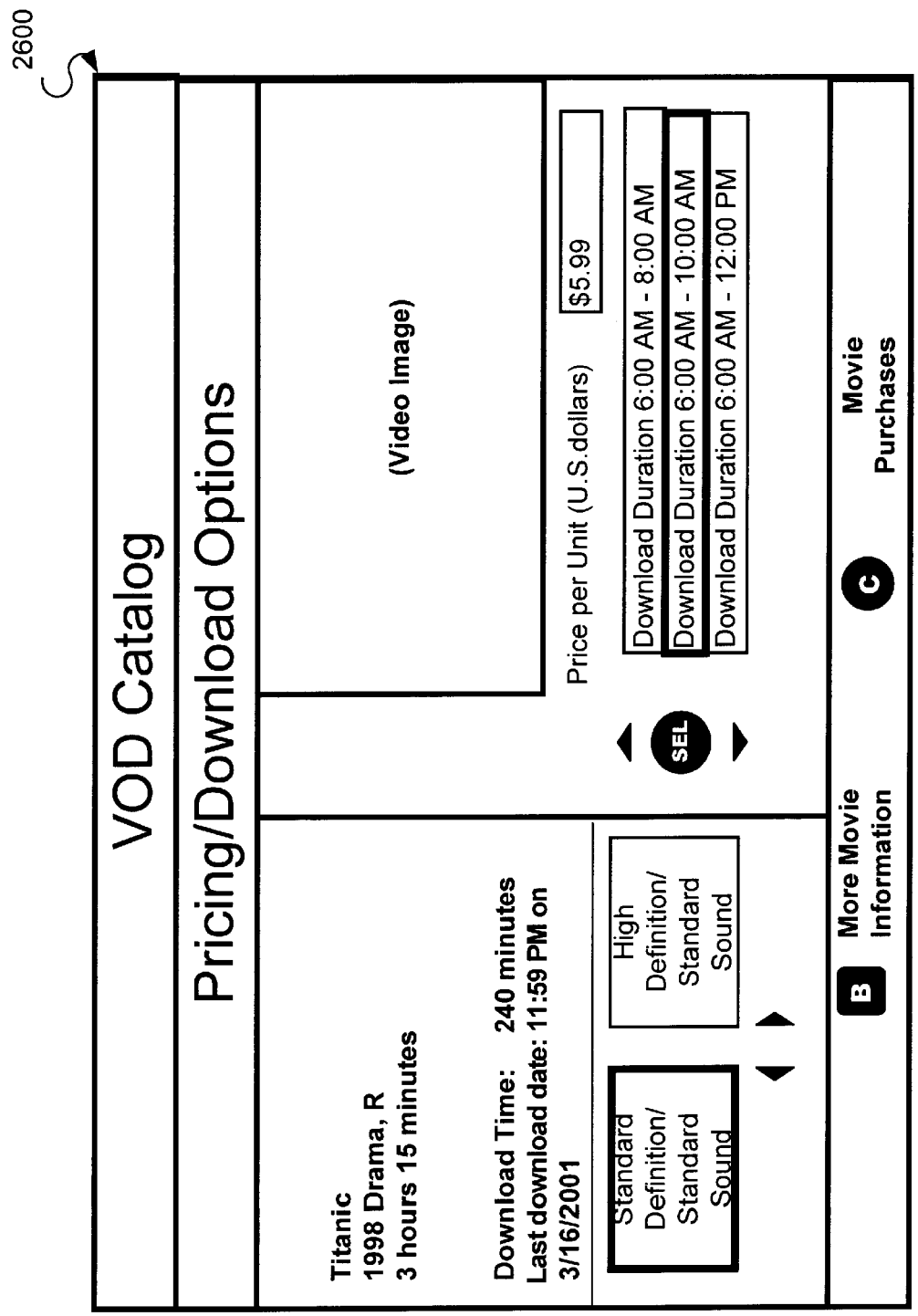
FIG. 26 is a screen diagram of an example purchasing screen for purchasable recordable media content, displaying a different download option from the option presented in the example purchasing screen of FIG. 25, in accordance with one embodiment of the invention.

FIG. 23 is a screen diagram that illustrates an example purchase screen 2300 wherein the user has selected a longer download duration that encroaches on a traditionally off-peak time for VOD, for example, early morning. An 8:00 AM download is highlighted in download option list 2346 with the same content quality as the prior screen. As noted, the price for the purchase, as displayed in price window 2360 decreases significantly from the prior highlighted option in FIG. 22. Also note the increase in the download duration as shown in the information section 2310, as the download in this option is allowed to "trickle" to the requesting DHCT 16. FIG. 24 illustrates an example purchase screen 2400 for the same download option as that shown for FIG. 23, but with the user scrolling to and highlighting in content quality index 2420 a standard definition, standard sound option. The result, as displayed in the price window 2460, is an even lower price than the high definition standard sound option highlighted in the prior purchase screen 2300, due to the lower bandwidth requirement of standard definition video downloads when compared to high definition downloads. FIG. 25 is a screen diagram of an example purchase screen 2500 that illustrates another download option, wherein the download will not begin until 8:00 AM, typically a low demand period for VOD, but it will be immediate starting at 8:00 AM. FIG. 26 is a screen diagram of an example purchase screen 2600 that illustrates another download option wherein the download begins later, and is of longer duration than the prior download option illustrated in example purchase screen 2500 in FIG. 25.

Figure 27:
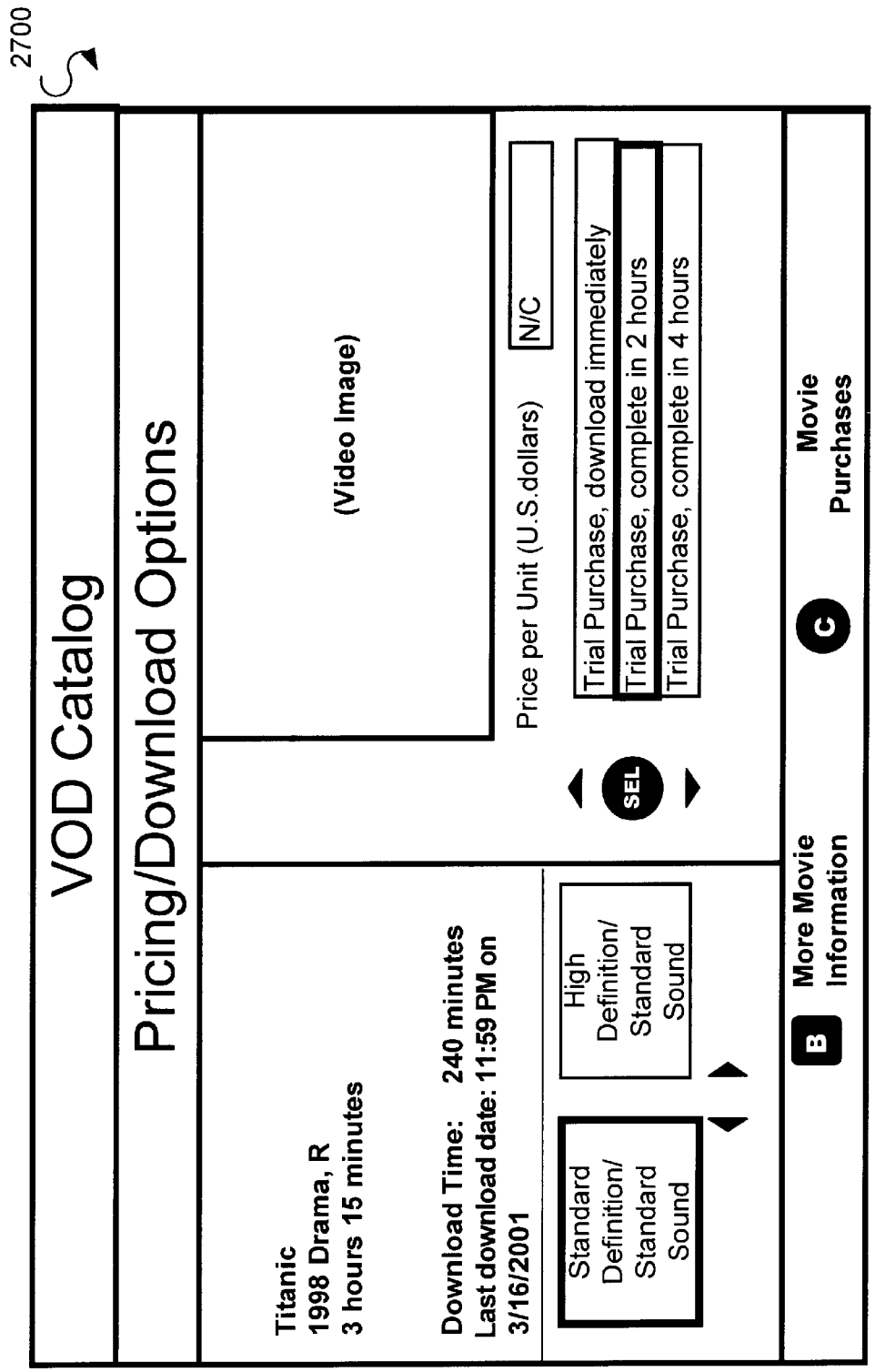
FIG. 27 is a screen diagram of an example purchasing screen for purchasable recordable media content, displaying a trial purchase option, in accordance with one embodiment of the invention.

FIG. 27 is a screen diagram of an example purchase screen 2700 that illustrates the trial purchase option. The purpose of the trial purchase is to promote "teaser" sales. With reference to FIG. 6 and continued reference to FIG. 27, a trial purchase includes the receipt to the primary storage device 413 (FIG. 4) of the DHCT 16 of an entire media content instance, such as but not limited to music, video, or software, and then the subsequent transfer to the secondary storage device 414 (FIG. 4) for a limited time period. The secondary storage device 414 (FIG. 4) medium, either a CD or DVD, is time stamped for valid decryption only for a specified time period. The content would continue to reside on the storage medium but could not be used. For example, the downloaded trial purchase may be encrypted in a manner that allows for the primary storage device 413 to read the decrypted PRM content, but is prevented from being downloaded to the secondary storage device 414. As time stamping is well known to those having ordinary skill in the art, further discussion need not be presented. Trial purchases could be used to promote teaser sales. As with any purchase, parental controls, such as, by way of non-limiting example a PIN entry screen, would be implemented, as described below.

Figure 28:
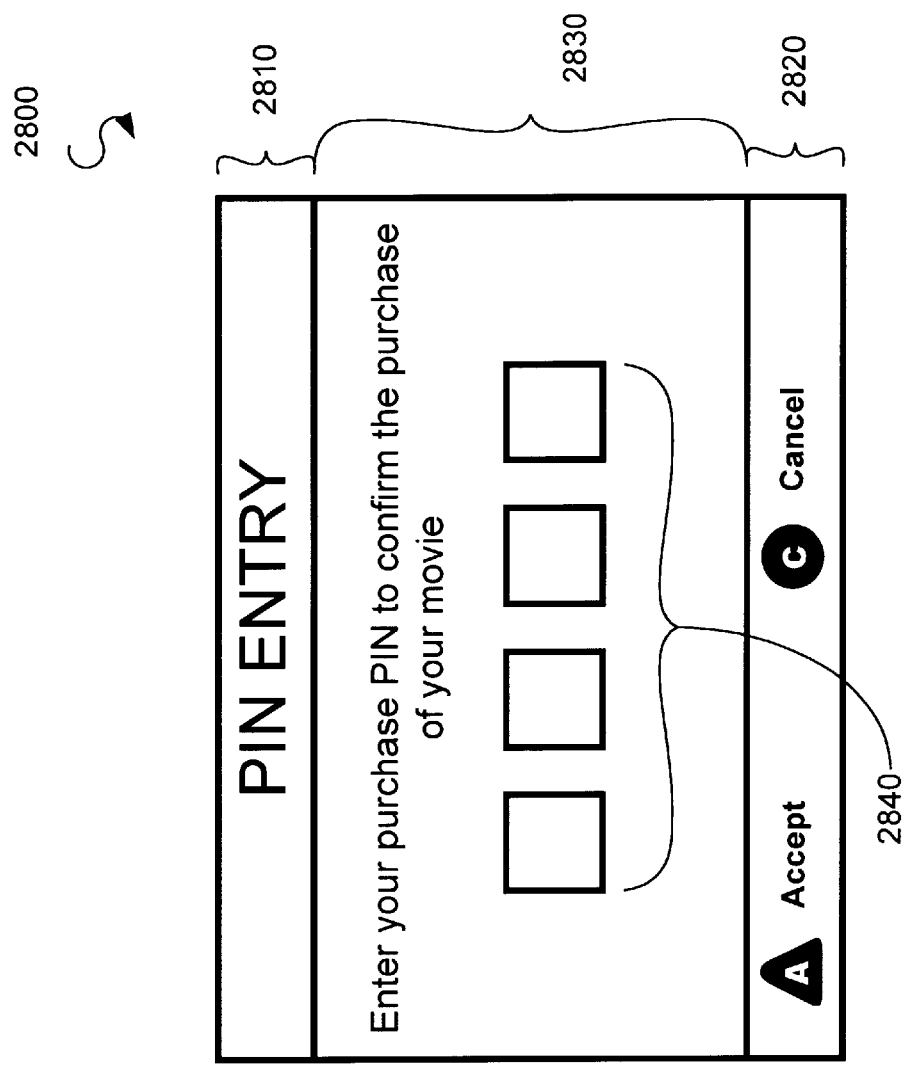
FIG. 28 is a screen diagram of depicting an example PIN entry window that is presented to the user after the user selects a download and content quality selection in FIG. 26, in accordance with one embodiment of the invention.
Figure 29:
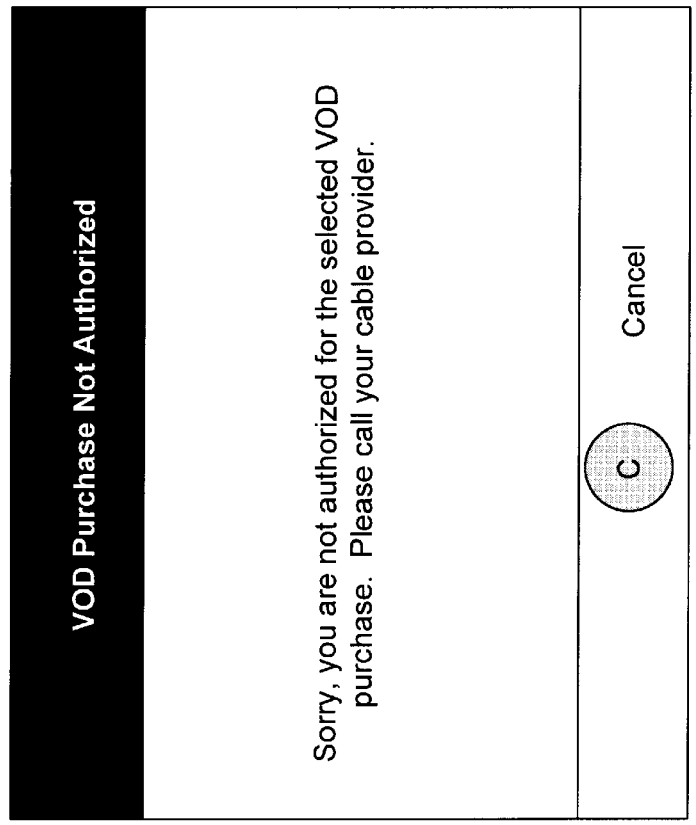
FIG. 29 is a screen diagram of an example screen display denying the user from purchasing content.
Figure 30:
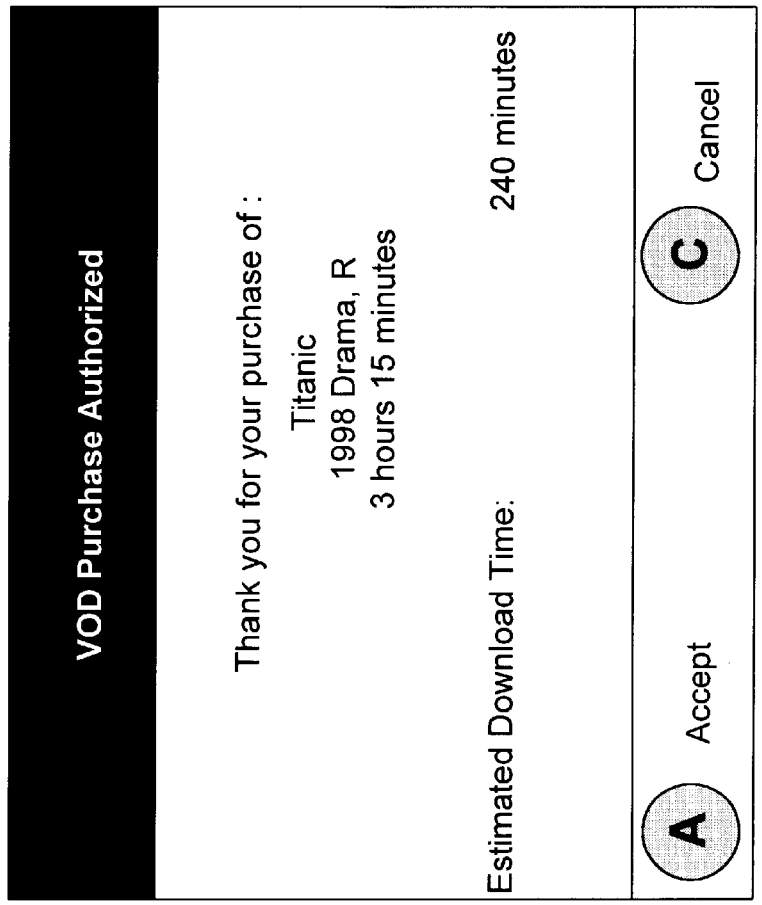
FIG. 30 is a screen diagram of an example acknowledgement screen display presented to the user upon confirming that a purchase is authorized.

FIG. 28 is a screen diagram depicting an example PIN entry window 2800 that is presented to the user after the user selects a download and content quality selection in one of the prior example purchase screens, such as, for example, example purchase screen 2600 of FIG. 26. A PIN Entry window 2800 is employed during the purchase of a PRM content instance to authenticate authorization to purchase and exercise parental control of purchases. The top portion 2810 contains the heading "PIN ENTRY" while the bottom portion 2820 illustrates relevant navigation buttons 20, available on the remote control device 480 (FIG. 4). A user can enter his or her PIN using the remote control device 480 (FIG. 4) while being presented with the PIN entry window 2800. Center portion 2830 contains entry fields 2840 that display a "*" for every PIN entry received from the user. In an alternative embodiment a user is not presented with a PIN entry screen and is not required to enter a PIN. In yet another alternative embodiment, a user is only presented with a PIN entry screen if the selected download can be achieved. FIG. 29 is a screen diagram of an example screen display 2900 denying the user from purchasing the selected content, for example, a VOD selection. FIG. 30 is a screen diagram of an example screen display 3000 acknowledging the purchase of the selection, and providing the user the opportunity to accept or cancel.

Figure 31:
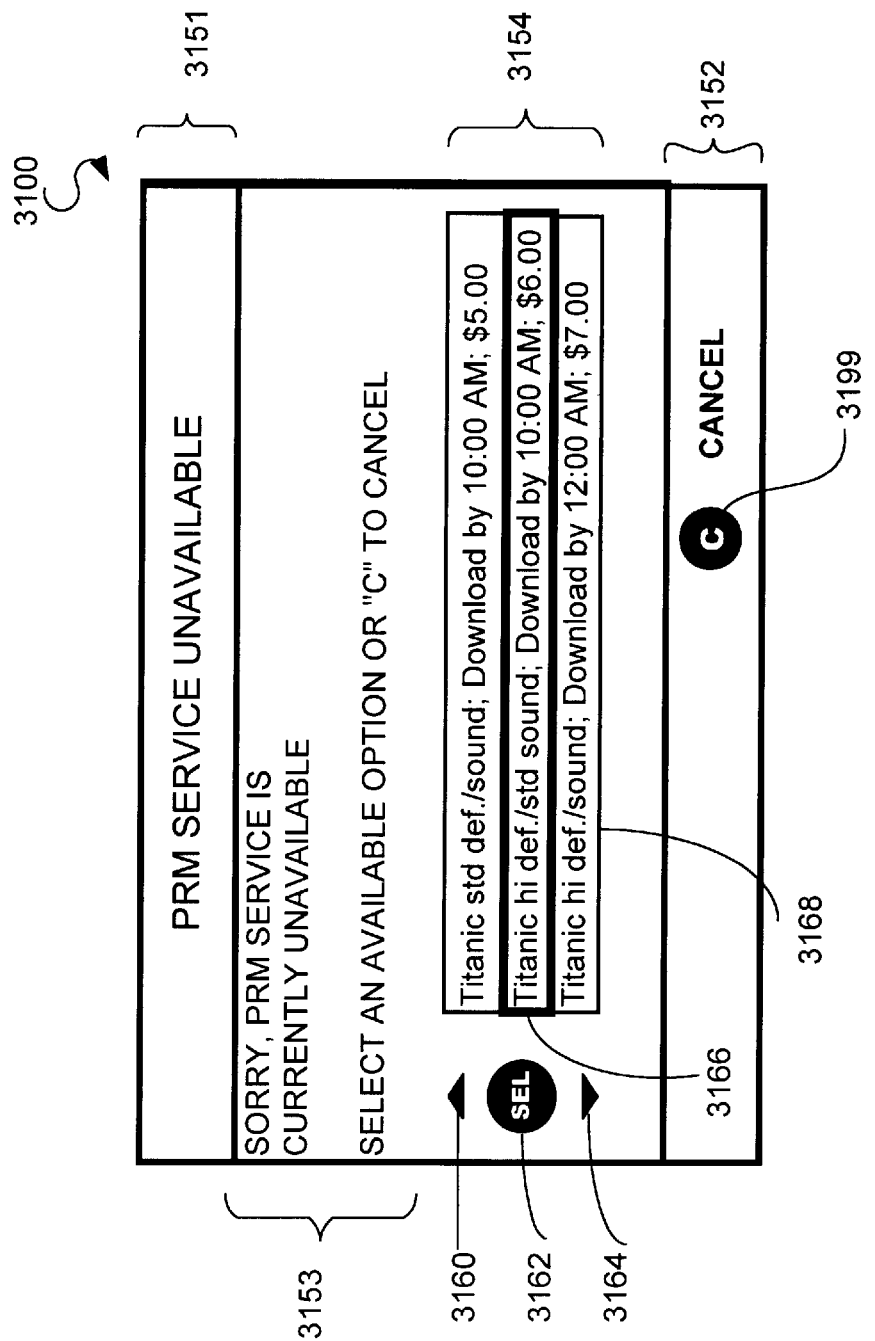
FIG. 31 is a screen diagram of an example screen display presented to the user when a selected purchase is unavailable, in accordance with one embodiment of the invention.

FIG. 31 is a screen diagram depicting an example barker screen 3100 resulting when a particular subscriber request for a PRM content instance cannot be fulfilled for lack of available bandwidth or other reasons. This screen 3100 may be presented after the user makes a PIN entry, or alternatively, after the user makes their download and content selections. Top portion 3151 contains a heading describing the problem to the user, a bottom portion 3152 illustrating relevant navigation button(s) available on the remote control device 480 (FIG. 4), and a top center portion 3153 which provides the user with a message, for example: "SORRY, PRM SERVICE IS CURRENTLY UNAVAILABLE. SELECT AN AVAILABLE OPTION OR "C" TO CANCEL". Download option list 3154 provides the user with a list of available download options and their content quality and price. As described earlier, communication occurs between the PRM client application and the PRM application server 319 when content is downloaded to maintain the status of the download. Errors or aborted attempts at the download of PRM content is thus known at the PRM client application 477, resulting in the generation of the example barker screen 3100 of FIG. 31. Alternatively, this screen can be generated at the headend 11. The PRM client application 477 will also generate the download option list 3154 as part of the example barker 311 according to the mechanisms used to initially generate the download options for the PRM purchase screens, such as example purchase screen 2200 (FIG. 22). The user may use up arrow 3164 or down arrow 3164 to advance the highlighted window 3166 over the option window 3168 containing the desired download option. The user may then enter their selection by pressing the select button 3162. Example barker 3100 is sent from the PRM application server 319 (FIG. 3) notifying the subscriber that their request could not be fulfilled. Alternatively, the unavailability of the selected PRM during the selected download times may be communicated by the PRM application server 319 (FIG. 3) to the PRM client application 477 (FIG. 4), wherein the PRM client application 477 (FIG. 4) generates this example barker 3100. Alternatively, a screen may be presented such that the user is presented with a button to select alternative download options from the one of the purchase screens described and illustrated above. Alternatively, a subscriber may be asked to accept a PRM content instance over a longer download duration but at the same price as a result of lack of bandwidth capacity or lack of VOD bandwidth availability for reuse. Consequently, upon subscriber consent, the PRM application server 319 (FIG. 3) employs other available bandwidth capacity using in-band or out-of-band BFS services or a combination thereof. Numerous unique combinations of PRM content delivery may be employed when lacking bandwidth resources.

Note that the preferred embodiment of the invention is not limited to secured communication or transfer of information. In some embodiments, the secure transfer is not required for the transfer of media products.

The DNCS 323 operating software and the PRM application client 477 which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), or a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted, or otherwise processed in a suitable manner if necessary, and then stored in a computer memory.

It is emphasized that the above-described embodiments of the present invention, particularly any "preferred embodiments", are merely possible examples of the implementations, among others, that are merely set forth for a clear understanding of the principles of the invention. It will be apparent to those skilled in the art that many modifications and variations may be made to the embodiments of the present invention, as set forth above, without departing substantially from the principles of the present invention. All such modifications and variations are intended to be included herein within the scope of the disclosure and present invention and protected by the following claims.

What is claimed is:

1. A media system comprising:
    logic configured to provide a user interface that provides a user with a plurality of media content selections available at various times;
    a portable drive for a portable medium, wherein the portable drive is configured to receive over a secured transmission medium the media content selected by the user; and
    a hard disk drive and memory including a first part of the memory and a second part of the memory, wherein the logic is further configured to receive the selected media content into the first part of the memory and transfer it to the hard disk drive, wherein the logic is further configured to transfer the selected media content from the hard disk drive to the second part of the memory, wherein the logic is further configured to transfer the selected media content from the second part of the memory to the portable drive.

2. The media system of claim 1, further comprising a subscriber network television system in electrical communication with the portable drive and a television.

3. The media system of claim 2, wherein the subscriber network television system is a digital broadband delivery system.

4. The media system of claim 2, wherein the subscriber network television system is a cable television system.

5. The media system of claim 1, wherein the logic is further configured to receive and transfer the media content selected by the user through memory transfers.

6. The media system of claim 1, wherein the logic is further configured to receive the selected media content into memory and transfer the selected media content to the portable drive.

7. The media system of claim 1, wherein the user interface is provided by a remote server.

8. The media system of claim 1, further comprising a processor and a memory that includes the logic, wherein the processor is configured with the logic to provide the user interface.

9. The media system of claim 1, further comprising a secure processor to access secured media content over the secured transmission medium.

10. The media system of claim 1, wherein the portable drive comprises a plurality of portable media.

11. The media system of claim 1, wherein the portable drive comprises a carousel media drive for simultaneously containing a plurality of portable media.

12. The media system of claim 1, wherein the portable drive comprises a magazine drive for simultaneously containing a plurality of portable media.

13. The media system of claim 1, further comprising a television display showing the user interface.

14. A method for recording media content, comprising the steps of:
    providing a user interface to select from a plurality of media content selections available at different times;
    receiving from a remote device the selected media content over a secured transmission medium; and
    receiving the selected media content into a first part of memory, then transferring the selected media content from the first part of memory to a hard disk drive, then transferring the selected media content from the hard disk drive to a second part of memory, then transferring the selected media content to the at least one portable medium
    recording the selected media content onto the at least one portable medium, wherein the at least one portable medium is located in a portable drive.

15. The method of claim 14, further comprising the step of receiving the selected media content over a secured subscriber network television system coupled to the portable drive and a television.

16. The method of claim 15, wherein the subscriber network television system is a digital broadband delivery system.

17. The method of claim 15, wherein the subscriber network television system is a cable television system.

18. The method of claim 14, further comprising the step of decrypting encrypted selected media content.

19. The method of claim 14, further comprising the step of providing the user interface from a remote server.

20. The method of claim 14, further comprising the step of providing the user interface from a local client device.

21. The method of claim 14, wherein the portable drive is coupled to a local client device.

22. The method of claim 14, wherein the remote device is a remote server.

23. The method of claim 14, wherein the remote device is a home computer.

24. The method of claim 14, further comprising the step of receiving the selected media content at a faster rate than the real-time playback rate.

25. The method of claim 14, further comprising the step of receiving the selected media content at a slower rate than the real-time playback rate.

26. The method of claim 14, further comprising the step of receiving the selected media content at different times.

27. The method of claim 14, further comprising the step of providing the user interface on a television screen display.

* * * * *